(12) United States Patent
Mizuhashi et al.

(10) Patent No.: US 10,648,996 B2
(45) Date of Patent: May 12, 2020

(54) SPECIMEN MEASUREMENT APPARATUS AND SPECIMEN ASPIRATION METHOD

(71) Applicant: SYSMEX CORPORATION, Kobe-shi, Hyogo (JP)

(72) Inventors: Toru Mizuhashi, Kobe (JP); Hiroaki Tobimatsu, Kobe (JP); Tomoya Hayashi, Kobe (JP)

(73) Assignee: SYSMEX CORPORATION, Kobe-shi (JP)

( * ) Notice: Subject to any disclaimer, the term of this patent is extended or adjusted under 35 U.S.C. 154(b) by 141 days.

(21) Appl. No.: 15/854,999

(22) Filed: Dec. 27, 2017

(65) Prior Publication Data
US 2018/0180638 A1    Jun. 28, 2018

(30) Foreign Application Priority Data

Dec. 28, 2016 (JP) .................................. 2016-256559

(51) Int. Cl.
G01N 35/10 (2006.01)
G01N 15/14 (2006.01)
G01N 35/00 (2006.01)
G01N 15/00 (2006.01)
G01N 15/10 (2006.01)

(52) U.S. Cl.
CPC ..... *G01N 35/1009* (2013.01); *G01N 15/1425* (2013.01); *G01N 35/1002* (2013.01); *G01N 35/1004* (2013.01); *G01N 35/1095* (2013.01); *G01N 15/1404* (2013.01); *G01N 2015/008* (2013.01); *G01N 2015/1006* (2013.01); *G01N 2015/1486* (2013.01); *G01N 2035/00465* (2013.01)

(58) Field of Classification Search
CPC .... G01N 35/1009; G01N 35/10; G01N 35/00; G01N 15/1425; G01N 15/14; G01N 15/10; G01N 15/00
USPC .............................. 422/502, 500, 50; 436/43
See application file for complete search history.

(56) References Cited

U.S. PATENT DOCUMENTS

| 5,182,617 A | 1/1993 | Yoneyama et al. |
| 2007/0212784 A1 | 9/2007 | Okun |
| 2015/0000428 A1* | 1/2015 | Fukuda .............. G01N 35/1009 73/864.11 |

FOREIGN PATENT DOCUMENTS

JP    2005-114419 A    4/2005

* cited by examiner

*Primary Examiner* — Christine T Mui
(74) *Attorney, Agent, or Firm* — Metrolex IP Law Group, PLLC

(57) ABSTRACT

A specimen measurement apparatus may include: an aspirator via which a specimen is aspirated. A flow path may be connected to the aspirator. A first pump may be connected to the flow path. A second pump may be connected to the flow path. A controller may select and cause either the first pump or the second pump to aspirate the specimen via the aspirator.

20 Claims, 30 Drawing Sheets

Background Art

SPECIMEN MEASUREMENT APPARATUS AND SPECIMEN ASPIRATION METHOD

CROSS REFERENCE TO RELATED APPLICATIONS

This application claims priority from prior Japanese Patent Application No. 2016-256559 filed with the Japan Patent Office on Dec. 28, 2016, the entire contents of which are incorporated herein by reference.

BACKGROUND

The disclosure relates to a specimen measurement apparatus and a specimen aspiration method.

As illustrated in FIG. 30, Japanese Patent Application Publication No. 2005-114419 (Patent Literature 1) describes a specimen measurement apparatus, which includes a first syringe pump CL1, a second syringe pump CL2, and a third syringe pump CL3. A single motor 310 drives the first syringe pump CL1 and the second syringe pump CL2. The third syringe pump CL3 is connected to the second syringe pump CL2 in series. The first syringe pump CL1 sends sheath liquid of a flow rate Q to a sheath flow cell FC. Along with the sheath liquid of the flow rate Q by the first syringe pump CL1, specimen liquid of a flow rate Qs from a specimen container C1 flow into the sheath flow cell FC.

The sheath flow cell FC discharges mixed liquid of specimen liquid and sheath liquid. The flow rate of the mixed liquid is Q+Qs. In the discharged mixed liquid, the mixed liquid of the flow rate Q is aspirated by the second syringe pump CL2, and the mixed liquid of the flow rate Qs is aspirated by the third syringe pump CL3.

When some specimen measurement apparatus aspirates a specimen, the aspiration quantities may differ depending on what is being measured. Therefore, it is desirable that a specimen measurement apparatus be able to deal with aspirating specimens with different quantities. In Patent Literature 1, despite different flow rates of the second syringe pump CL2 and the third syringe pump CL3, both syringe pumps are driven at the same time. The specimen measurement apparatus in Patent Literature 1 only has a simple aspiration mode, in which a certain amount of mixed liquid is aspirated. The total amount of the mixed liquid is the sum of flow rates of the syringe pump CL2 (Q) and the syringe pump CL3 (Qs), which is Q+Qs. Therefore, the specimen measurement apparatus of Patent Literature 1 can only handle aspirating specimens having a certain quantity of mixed liquid.

SUMMARY

A specimen measurement apparatus according to one or more embodiments may include: an aspirator via which a specimen is aspirated; a flow path connected to the aspirator; a first pump connected to the flow path; a second pump connected to the flow path; and a controller that selects and causes either the first pump or the second pump to aspirate the specimen via the aspirator.

A specimen aspiration method according to one or more embodiments may include: selecting either a first measurement mode or a second measurement mode; driving, based on the selecting, a first pump for the first measurement mode or a second pump for the second measurement mode; and aspirating a specimen via an aspirator connected to a flow path, based on the driving, by the first pump or by the second pump.

DETAILED DESCRIPTION

Figure 1:
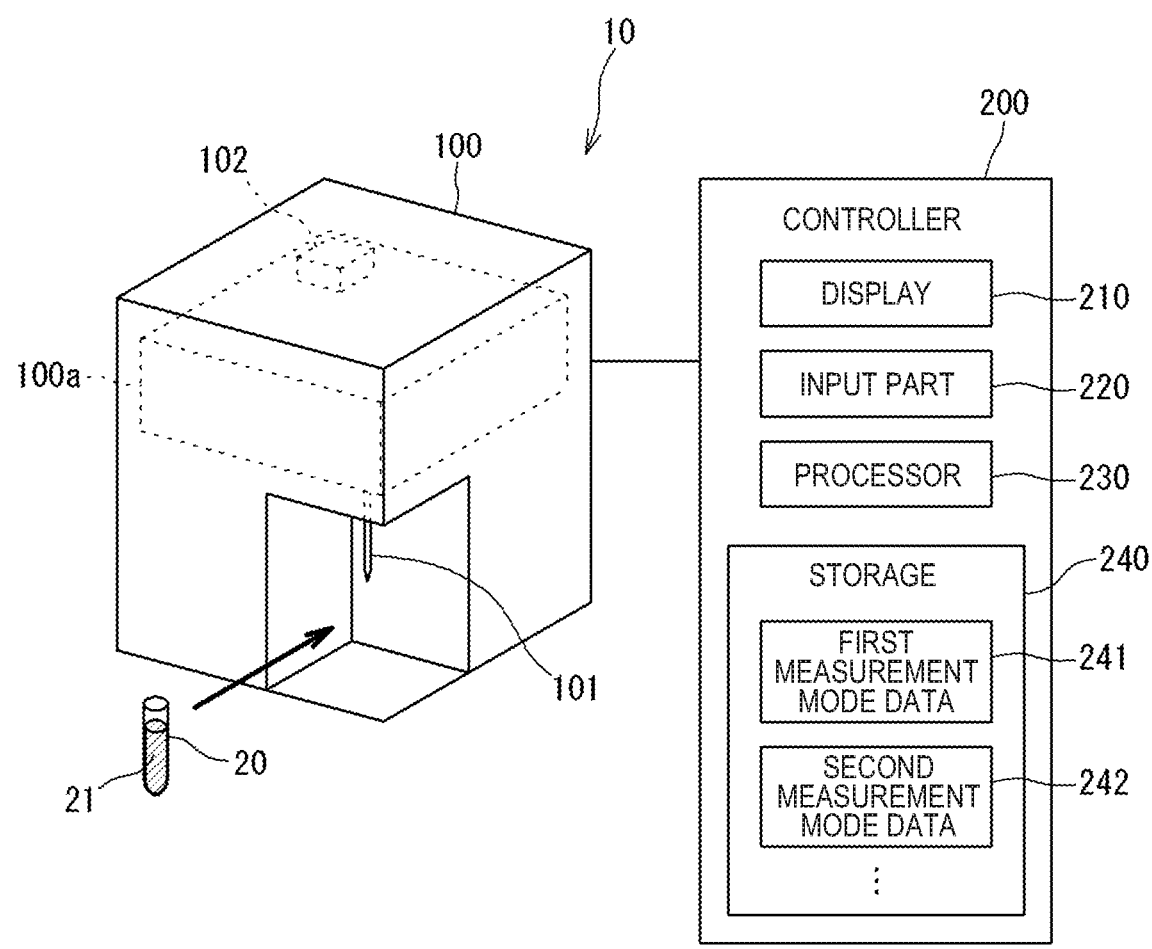
FIG. 1 is a configuration diagram illustrating a specimen measurement apparatus suitable for use with one or more embodiments.

In one or more embodiments in a first example, a specimen measurement apparatus 10 includes an aspirator 101, a flow path 110 connected to the aspirator 101, a first pump 121 connected to the flow path 110, and a second pump 122 connected to the flow path 110. The specimen measurement apparatus 10 also includes a controller 200 which selects and drives either the first pump 121 or the second pump 122 when the aspirator 101 aspirates a specimen. The apparatus can deal with different aspiration modes, such as aspirating different quantities of a specimen, by selecting and driving either the first pump 121 or the second pump 122.

It may be preferable that the second pump 122 has a different aspiration ability from the first pump 121. In some embodiments, a different aspiration ability may include a difference in which the first pump and the second pump are able to aspirate different quantities of a specimen.

It may be preferable that the controller 200 be able to select one from a plurality of measurement modes to measure a specimen and also to select a pump to drive according to the selected measurement mode when to aspirate a specimen via the aspirator 101. In this way, a pump to be driven is selected according to a selected measurement mode.

It may be preferable that a plurality of measurement modes include a first measurement mode, in which a first quantity of a specimen is aspirated with the first pump 121, and a second measurement mode, in which a second quantity of a specimen different from the first quantity of a specimen is aspirated with the second pump 122. For example, the first measurement mode may be a measurement mode to count the number of CD34-positive stem cells in a specimen or to calculate the ratio of the specific cell-surface-marker-positive cells in a specimen. Also, the second measurement mode may be a measurement mode to measure the number of CD4-positive lymphocytes in a specimen. A plurality of measurement modes may include the first measurement mode, in which a variable quantity of a specimen is aspirated with the first pump 121, and the second measurement mode, in which a fixed quantity of a specimen is aspirated with the second pump 122.

The specimen measurement apparatus 10 may further include a mixing chamber 190. In the mixing chamber 190, a mixed specimen, which contains a reagent and a specimen dispensed from a specimen container 20, is prepared. It may be preferable that a plurality of measurement modes of the apparatus include a first measurement mode, in which a specimen in the specimen container 20 is aspirated via the aspirator 101 by the first pump 121, and a second measurement mode, in which a mixed specimen in the mixing chamber 190 is aspirated via the aspirator 101 by the second pump 122. Since the quantity to aspirate a specimen in the specimen container may differ from the quantity to aspirate a mixed specimen in the mixing chamber, it is efficient to include different pumps to aspirate different quantities of a specimen.

The specimen measurement apparatus 10 may further include the mixing chamber 190. In the mixing chamber 190, a mixed specimen, which contains a reagent and a specimen dispensed from the specimen container 20, is prepared. The controller 200 of the apparatus may operate the first pump 121 to aspirate a specimen in the specimen container 20 via the aspirator 101 and the second pump 122 to aspirate a specimen in the mixing chamber 190 via the aspirator 101. Since the quantity to aspirate a specimen in the specimen container may differ from the quantity to aspirate a mixed specimen in the mixing chamber, it is efficient to include different pumps to aspirate different quantities of a specimen.

It may be preferable that the first pump 121 is a pump selected from a syringe pump, a diaphragm pumps, a peristaltic pump, and an air pump. It may be preferable that the second pump 122 is a pump selected from a group consisting of a syringe pump, a diaphragm pumps, a peristaltic pump, and an air pump. The first pump 121 and the second pump 122 may be the same type or different types of pumps. For example, it may be preferable that the first pump 121 is a syringe pump and the second pump 122 is a diaphragm pump. It may also be preferable that aspiration abilities of the first pump 121 and the second pump 122 are different despite the types of the first pump 121 and the second pump 122. The aspiration ability may differ depending on the pump capacity.

It may be preferable that the flow path 110 is connected to a detector 102, which measures a specimen aspirated into the flow path 110. Also, it may be preferable that the controller 200 drives at least one of the first pump 121 and the second pump 122 when a specimen aspirated into the flow path 110 is sent to the detector 102. In this case, an aspirated specimen can be sent to the detector 102.

It may be preferable that the controller 200 drives a syringe pump when a specimen aspirated into the flow path 110 is sent to the detector 102. The syringe pump may be either the first pump 121 or the second pump 122, or another pump.

It may be preferable that the first pump 121 is connected to the flow path 110 via a first branched flow path 111 branched from the flow path 110 and that the second pump 122 is connected to the flow path 110 via a second branched flow path 112 branched from the flow path 110. It may be preferable that both the first branched flow path 111 and the second branched flow path 112 are cleaned after a specimen is aspirated via the aspirator 101 into the flow path 110.

It may be preferable that the measurement apparatus includes a switching valve 182, which selectively connects the first branched flow path 111 and the second branched flow path 112 to the flow path 110. With this condition, the first branched flow path 111 and the second branched flow path 112 can be selectively connected to the flow path 110.

In one or more embodiments of a specimen aspiration method, a first measurement mode and a second measurement mode are selected and performed. In the first measurement mode, a first pump aspirates a specimen. The first pump 121 is connected to a flow path which is connected to an aspirator to aspirate a specimen. In the second measurement mode, the second pump 122, which is connected to the flow path, aspirates a specimen. The specimen aspiration method may select a measurement mode from a plurality of measurement modes and selectively performs the first measurement mode or the second measurement mode according to the selected measurement mode. It may be preferable that the second pump 122 has the different ability to aspirate a specimen from the first pump 121.

In one or more embodiments, one of two pumps, either the first pump 121 or the second pump 122, can be selected and driven instead of driving two pumps at the same time, which achieves to aspirate a specimen by driving a selected pump out of the two pumps.

[1. Specimen Measurement Apparatus]

A specimen measurement apparatus 10 illustrated in FIG. 1 includes a main body 100 configured to measure a specimen 21 and a controller 200. The specimen 21 may include a specimen such as blood or other body fluid. The term blood may refer to peripheral blood or umbilical cord blood. In the main body 100, an aspirator 101 aspirates the specimen 21 contained in a specimen container 20. The specimen 21 contained in the specimen container 20 may be a specimen with a reagent or without a reagent. The aspirator 101 may be or may include an aspiration structure such as a nozzle, which can aspirate and discharge a specimen.

The main body 100 includes a flow circuit 100a in which an operation, such as aspiration of a specimen, may be performed. The flow circuit 100a includes a detector 102 configured to measure the aspirated specimen. For example, the detector 102 may be a flow cytometer. A flow cytometer optically measures a specimen using flow cytometry technique. The measurement value measured or detected by the detector 102 is sent to the controller 200 as a signal, a collection of signals, data and the like. The controller 200 processes the measurement value sent from the detector 102.

As illustrated in FIG. 1, the controller 200 may be a computer processing device, such as a computer, which includes a processor 230, and a storage 240 and/or a memory. The processor 230 runs computer programs stored in the storage 240. In one or more embodiments, the computer programs cause the processor to control the main body 100 and to measure the measurement value sent from the detector 102.

The controller 200 includes a display 210. The display 210 displays screens. For instance, the screens include an operation screen for users to operate the main body 100 and a screen to show measurement results. The controller 200 also includes an input part 220. The input part 200 receives operations by a user. The input part 200 may be an input device such as a keyboard or a mouse.

As illustrated in FIG. 1, the storage 240 stores a data 241 and a data 242, which define, specify, or provide a plurality of measurement modes to measure a specimen. The plurality of measurement modes are operational rules of the main body 100 in response to test items. The main body 100 performs differently depending on test items. Thus, setting a plurality of measurement modes corresponding to a plurality of test items enables the main body 100 to operate in response to different test items. Since the main body 100 in one or more embodiments can operate in response to a plurality of test items, it has much flexibility.

The test items, for example, include a CD34-positive stem cell count test, a hematopoietic tumor cell surface antigen test, and an HIV lymphocyte subset test. For instance, the CD34-positive stem cell count test is a test to measure the number of CD34-positive stem cells out of peripheral blood, umbilical cord blood, and blood components with apheresis. The hematopoietic tumor cell surface antigen test is a test to calculate the ratio of certain cell-surface-marker-positive cells from blood cell components of patients with hematopoietic tumor. The ratio of cell-surface-marker-positive cells may mean the ratio of cell-surface-marker-positive cells to white blood cells. The HIV lymphocyte subset test is, for example, a test to measure the number of CD4-positive lymphocytes from peripheral blood of HIV patients.

The storage 240 may store measurement mode data of the CD34-positive stem cell count test, hematopoietic tumor cell surface antigen test, and HIV lymphocyte subset test. The storage 240 can also store other measurement mode data.

A plurality of measurement modes are displayed on the display 210. The input part 220 receives a selection of a measurement mode to be operated out of a plurality of measurement modes from a user. The controller 200 reads the data 241 and the data 242 for the selected measurement mode from the storage 240 and operates the main body 100 based on the data 241 and the data 242. The operation of the main body 100 in response to different measurement modes is explained in the later section.

[2. Specimen Aspiration]

[2.1 First Example of Specimen Aspiration]

Figure 2:
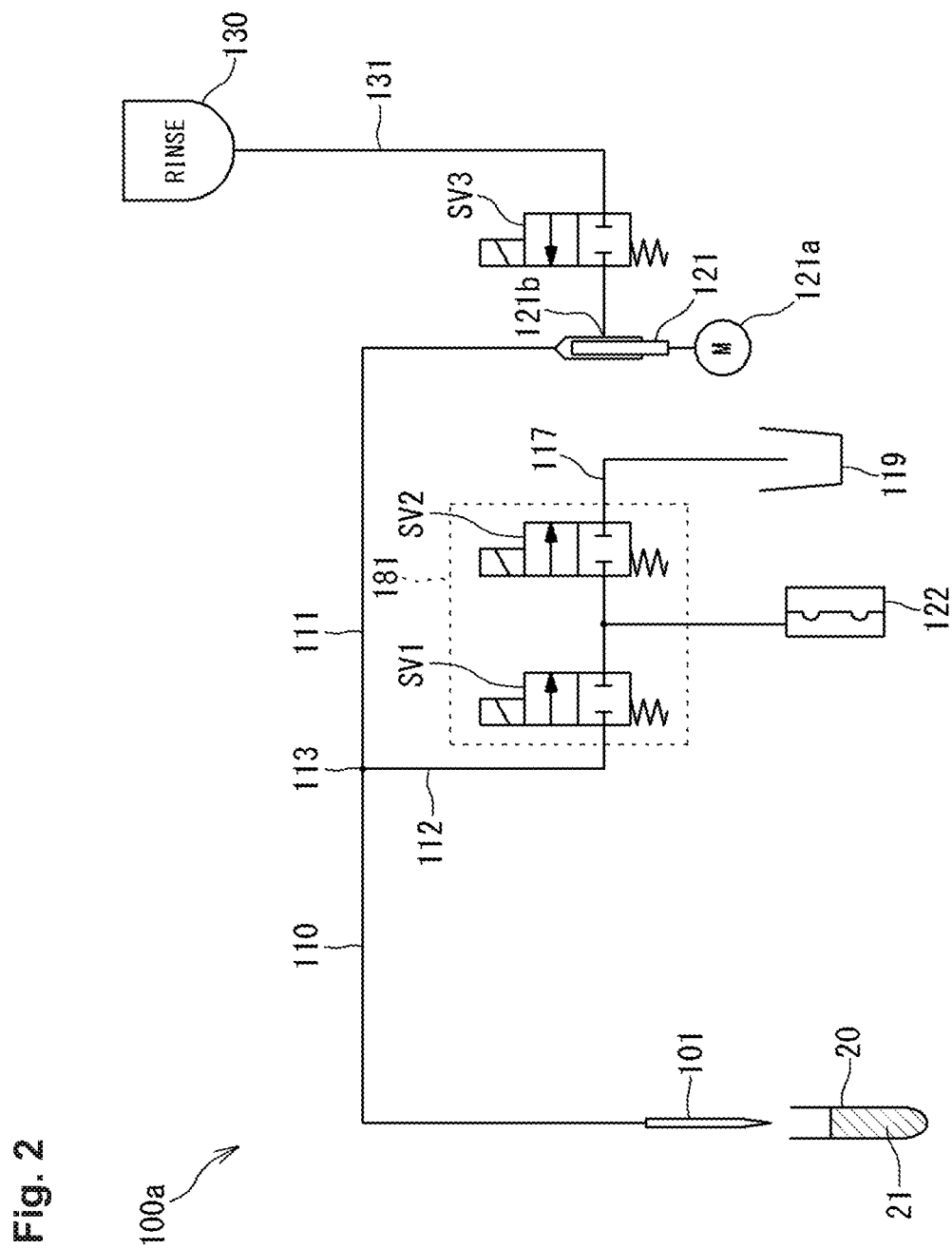
FIG. 2 is a flow circuit diagram illustrating a first example for specimen aspiration in accordance with one or more embodiments.

FIG. 2 illustrates a first example of the flow circuit 100a inside of the main body 100. The operation of the flow circuit 100a is controlled by the controller 200. The flow circuit 100a illustrated in FIG. 2 includes a main flow path 110 or a main channel connected to the aspirator 101. The main flow path 110 branches or splits into a first branched flow path 111 and a second branched flow path 112, or a first branched channel and a second branched channel, at a branched part 113. At the branched part 113, the main flow path 110 may branch or split into three or more branched flow paths.

The first branched flow path 111 is connected to the first pump 121, which may be a pump such as a syringe pump. The first pump (syringe pump) 121 conveys liquid by aspirating or discharging. The first pump 121 is suitable for conveying relatively small amounts of liquid and can convey the accurate amount of liquid with accurate speed.

The first pump 121 is driven by a motor 121a, and the motor 121a is controlled by the controller 200. The controller 200 drives the motor 121a of the first pump 121 and causes the first pump 121 to aspirate or discharge liquid. The amount of liquid aspirated and discharged by the first pump 121 is changeable, and the first pump 121 can convey a variable amount of liquid. The controller 200 controls the amount of aspirating and discharging liquid of the first pump 121.

By driving the first pump 121 to aspirate liquid, the controller 200 causes the aspirator 101, connected to the first pump 121 via the first branched flow path 111 and the main flow path 110, to aspirate the specimen 21. The aspirated specimen flows into the main flow path 110. The aspirated specimen may also flow into the first branched flow path 111. FIG. 2 illustrates an example in which the aspirator 101 aspirates the specimen 21 contained in the specimen container 20; however, the aspirator 101 can also aspirate a specimen contained in a chamber in the main body 100.

The first pump 121 includes a port 121b. Through the port 121b, cleaning liquid is sent into the first pump 121 to clean paths. The port 121b is connected to a cleaning liquid container 130 via a flow path 131. A solenoid valve SV3 is provided in the middle of the flow path 131. The solenoid valve SV3 is normally closed.

The second branched flow path 112 is connected to a second pump 122. When the branched part 113 branches into three or more branched flow paths, a pump can be connected to another branched flow path other than the first branched flow path 111 and the second branched flow path 112.

In the present example, the second pump 122 may be a diaphragm pump. The second pump (diaphragm pump) 122 conveys liquid by aspirating and discharging. The accuracy of conveying amount of liquid and conveying speed of a diaphragm pump may be worse than that of a syringe pump. A diaphragm pump, however, is suitable for transferring relatively large amounts of liquid and transferring liquid rapidly. The aspiration ability of the second pump 122 in one or more embodiments is different from that of the first pump 121. In other words, the second pump 122 in one or more embodiments has better aspiration ability and can rapidly aspirate more quantities of a specimen than the first pump 121.

The second pump 122 in one or more embodiments conveys a fixed amount of liquid instead of a variable amount of liquid. The controller 200 controls the second pump 122.

In one or more embodiments, it may be preferable that the first pump and the second pump can convey the fixed amount of liquid to the forward and backward directions. Types of the first and second pumps, for example, include syringe pumps, diaphragm pumps, peristaltic pumps, air pumps and so on. When an air pump including a valve is used, the time of opening and closing the valve can be controlled and the air pump can thereby convey a fixed amount of liquid. Also, an air pump can change the direction of conveying liquid by switching positive and negative pressures.

The controller 200 drives the second pump 122 to aspirate a specimen, and the specimen 21 is aspirated via the aspirator 101, which is connected to the second pump 122 via the second branched flow path 112 and the main flow path 110. The aspirated specimen flows into the main flow path 110. The aspirated specimen also may flow into the second branched flow path 112.

In the middle of the second branched flow path 112, a three-way solenoid valve or a three-way switching valve 181 is provided. The three-way switching valve or the three-way switching valve 181 includes a solenoid valve SV1 and a solenoid valve SV2, and both valves are normally closed. The solenoid valve SV1 is located in the second branched flow path 112. When the solenoid valve SV1 opens, the aspirator 101 and the second pump 122 are connected. The solenoid valve SV2 is located in a flow path 117, which connects the second branched flow path 112 and a drainage chamber 119. When the solenoid valve SV2 opens, the second pump 122 and the drainage chamber 119 are connected.

Figure 3:
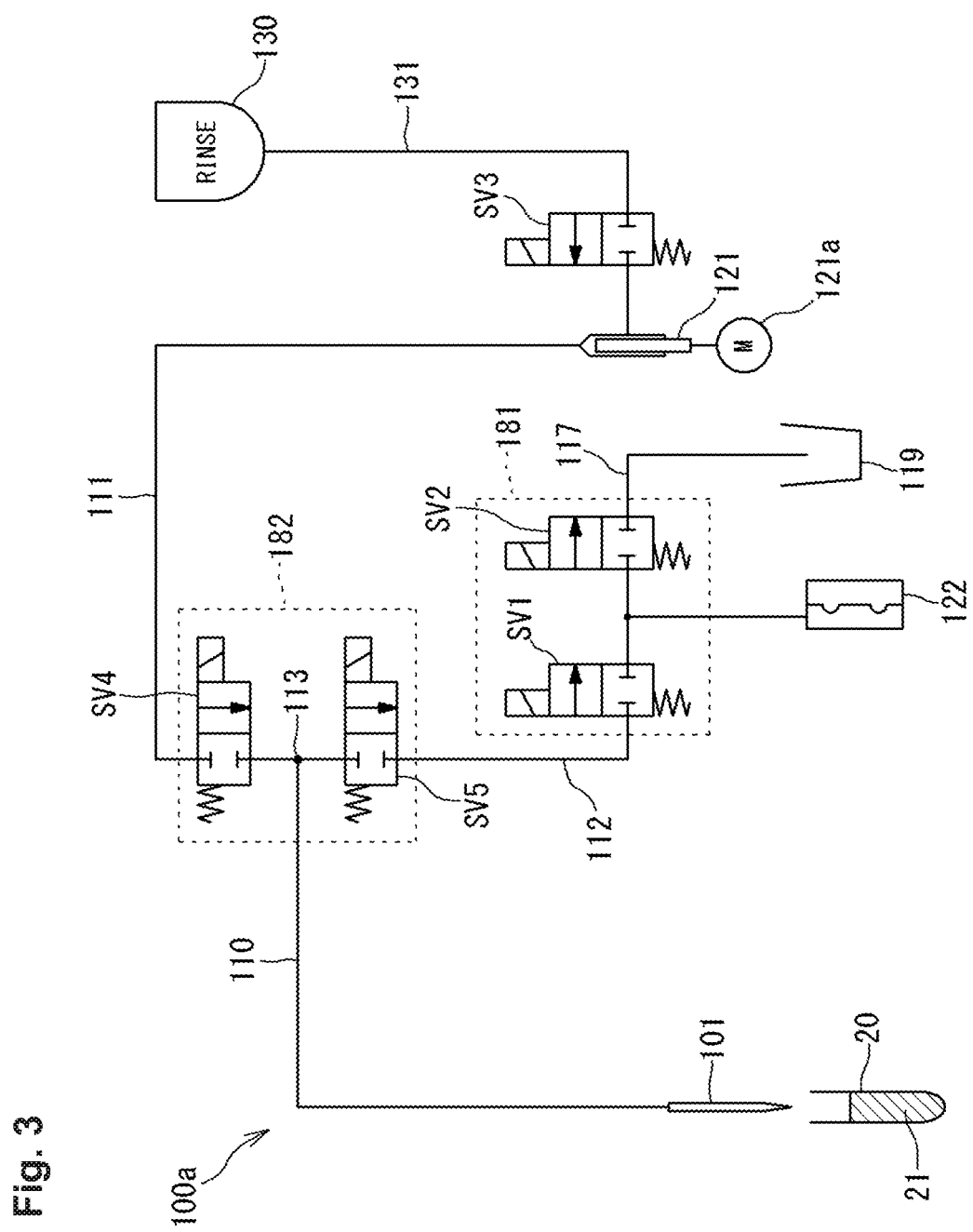
FIG. 3 is a flow circuit diagram further illustrating a first example for specimen aspiration in accordance with one or more alternative or additional embodiments.

As illustrated FIG. 3, a three-way switching valve 182 can be added to the flow circuit 100a in FIG. 2. The three-way switching valve 182 selects and connects either the first branched flow path 111 or the second branched flow path 112 to the main flow path 110. The three-way switching valve 182 includes a solenoid valve SV4 and a solenoid valve SV5, and both the solenoid valve SV4 and the solenoid valve SV5 are normally closed. The solenoid valve SV4 is located in the first branched flow path 111. When the solenoid valve SV4 is closed, the solenoid valve SV4 separates the first branched flow path 111 from the main flow path 110. When the solenoid valve SV4 is opened, the solenoid valve SV4 connects the main flow path 110 to the first branched flow path 111. The solenoid valve SV5 is located in the second branched flow path 112. When the solenoid valve SV5 is closed, the solenoid valve SV5 separates the second branched flow path 112 from the main flow path 110. When the solenoid valve SV5 is opened, the solenoid valve SV5 connects the main flow path 110 to the second branched flow path 112.

Figure 4:
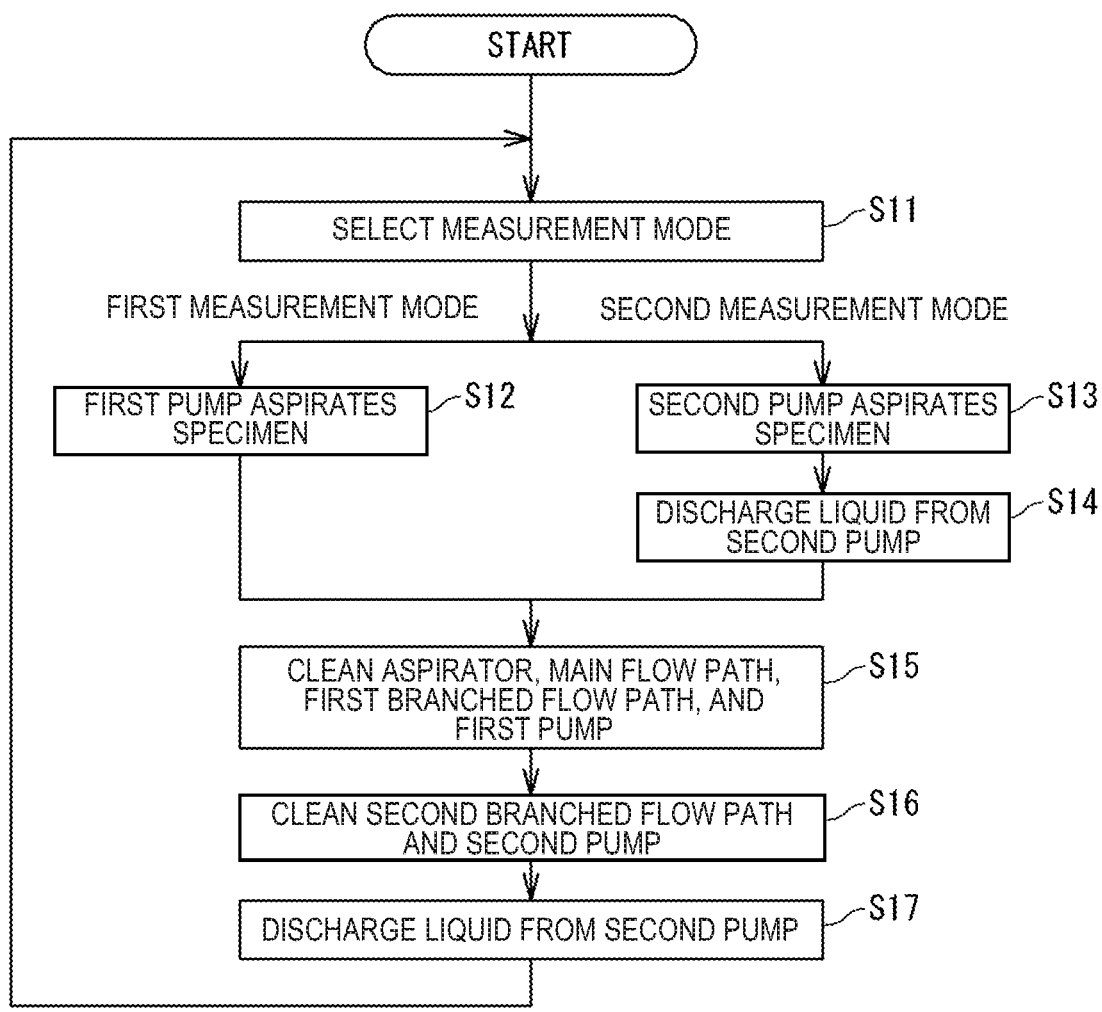
FIG. 4 is a process flow diagram illustrating operational aspects of specimen aspiration for a flow circuit of a first example in accordance with one or more embodiments.

The controller 200 may control the flow circuit 100a, such as shown in the examples illustrated in FIG. 2 and FIG. 3, according to example operations illustrated in FIG. 4. In a step S11, the controller 200 receives a measurement mode selection from a user. The user conducts an operation with the input part 220 to select one measurement mode from a plurality of measurement modes displayed in the display 210. In one or more embodiments, the plurality of measurement modes that can be set may include the first measurement mode and the second measurement mode. The first measurement mode and the second measurement mode operate different pumps to aspirate a specimen, such as the first pump 121 and the second pump 122.

Figure 5:
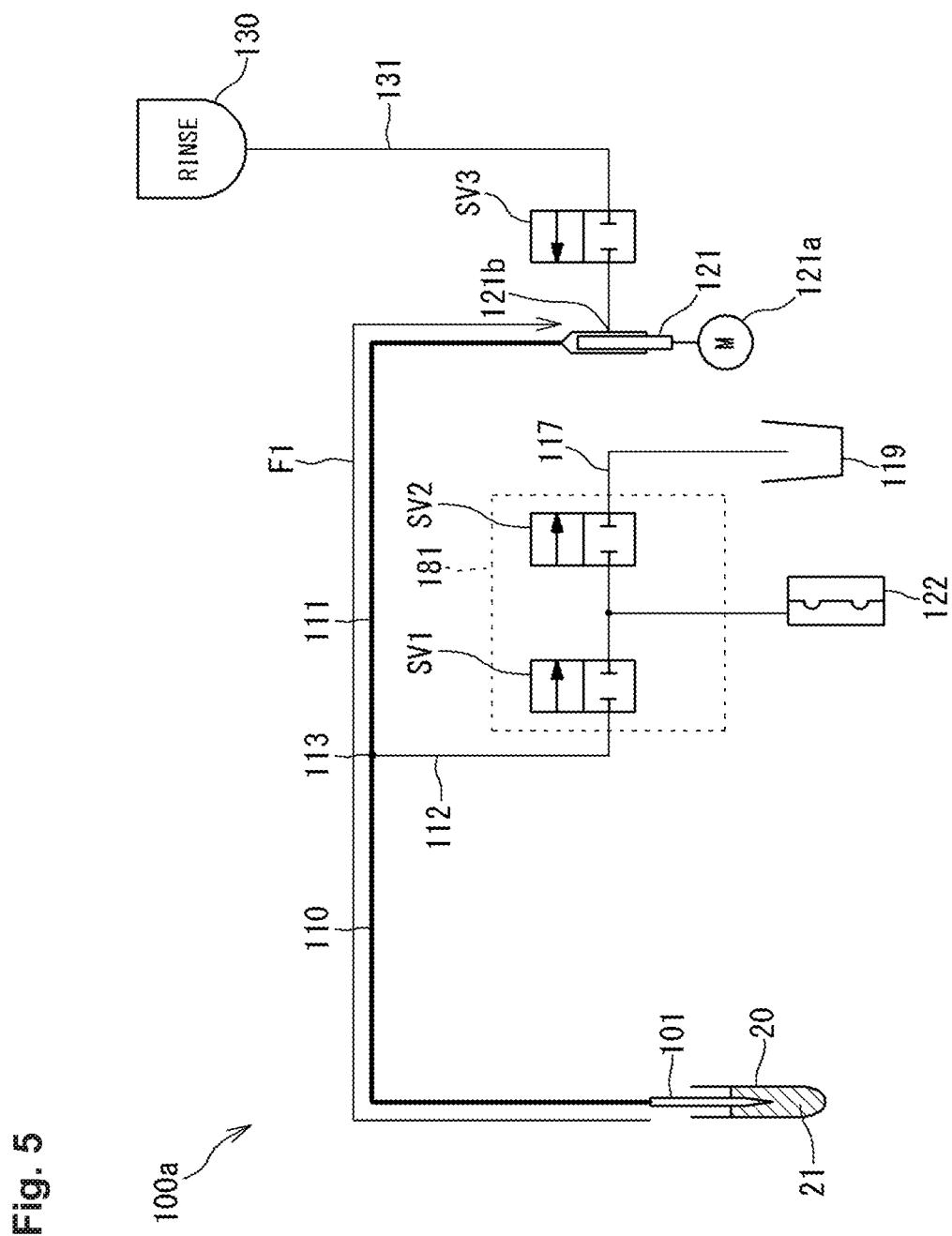
FIG. 5 is a flow circuit diagram further illustrating a first example for specimen aspiration in accordance with one or more embodiments.

When the first measurement mode is selected, the controller 200 drives the first pump 121 to aspirate a specimen and causes an aspiration force F1 to be generated, such as is shown in FIG. 5, in a step S12. The aspiration force F1 caused by the first pump 121 aspirates the specimen 21 by the aspirator 101. The aspirated specimen 21 flows into the main flow path 110 and the first branched flow path 111. The first pump 121 stops when a certain quantity of a specimen is aspirated. In FIG. 5, a flow path, such as the main flow path 110 and the first branched flow path 111, may be filled with the specimen 21 as illustrated with a bolded line. Also, a bolded line of the flow circuit 100a in other figures means that the flow paths are filled with a specimen.

The first pump 121 in one or more embodiments is a syringe pump having an aspiration quantity that is relatively small but accurate. Therefore, the first measurement mode in one or more embodiments is suitable for accurately aspirating a first quantity of a specimen, which may be a relatively small volume. Also, since the first pump 121 in one or more embodiments can aspirate a variable volume of specimen, the first measurement mode in one or more embodiments may be a measurement mode, which aspirate a variable volume of a specimen.

Figure 6:
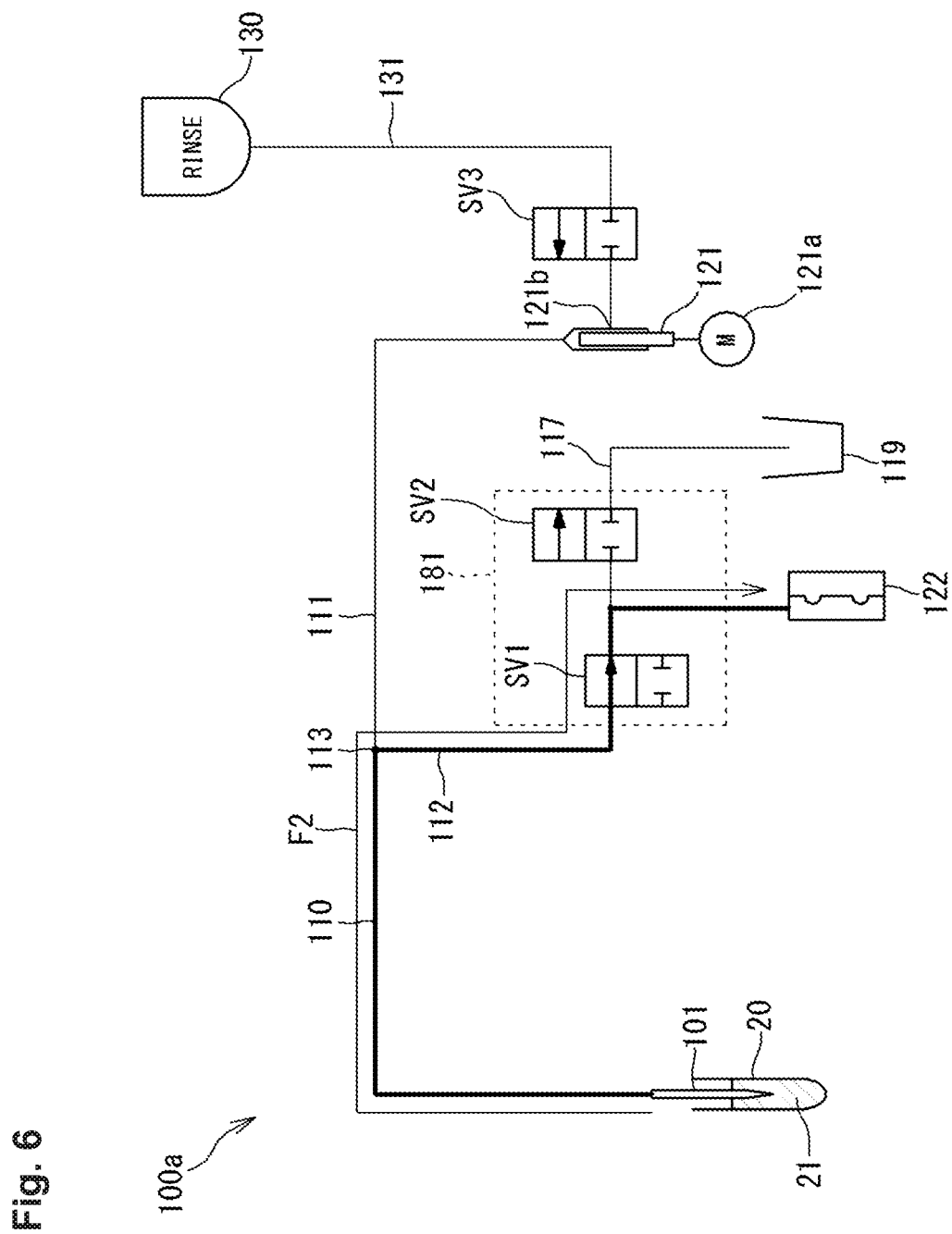
FIG. 6 is a flow circuit diagram further illustrating a first example for specimen aspiration in accordance with one or more embodiments.

When the second measurement mode is selected, the controller 200 drives the second pump 122 to aspirate a specimen and causes an aspiration force F2 to be generated, such as in shown FIG. 6, in a step S13. The solenoid valve SV1 is opened under the condition of step S13. The aspiration force F2 caused by the second pump 122 aspirates the specimen 21 by the aspirator 101. The aspirated specimen 21 flows into the main flow path 110 and the second branched flow path 112. When a certain quantity of a specimen is aspirated, the controller 200 closes the solenoid valve SV1 and stops aspiration of a specimen by the second pump 122.

The second pump 122 in one or more embodiments is a diaphragm pump, and its aspiration ability is higher than that of the first pump 121. Therefore, the second measurement mode in one or more embodiments is suitable for rapidly aspirating a second quantity of a specimen, which is larger than the first quantity. Also, since the second pump 122 in one or more embodiments aspirates a fixed quantity of a specimen, the second measurement mode may be a measurement mode to aspirate the fixed quantity of a specimen.

Figure 7:
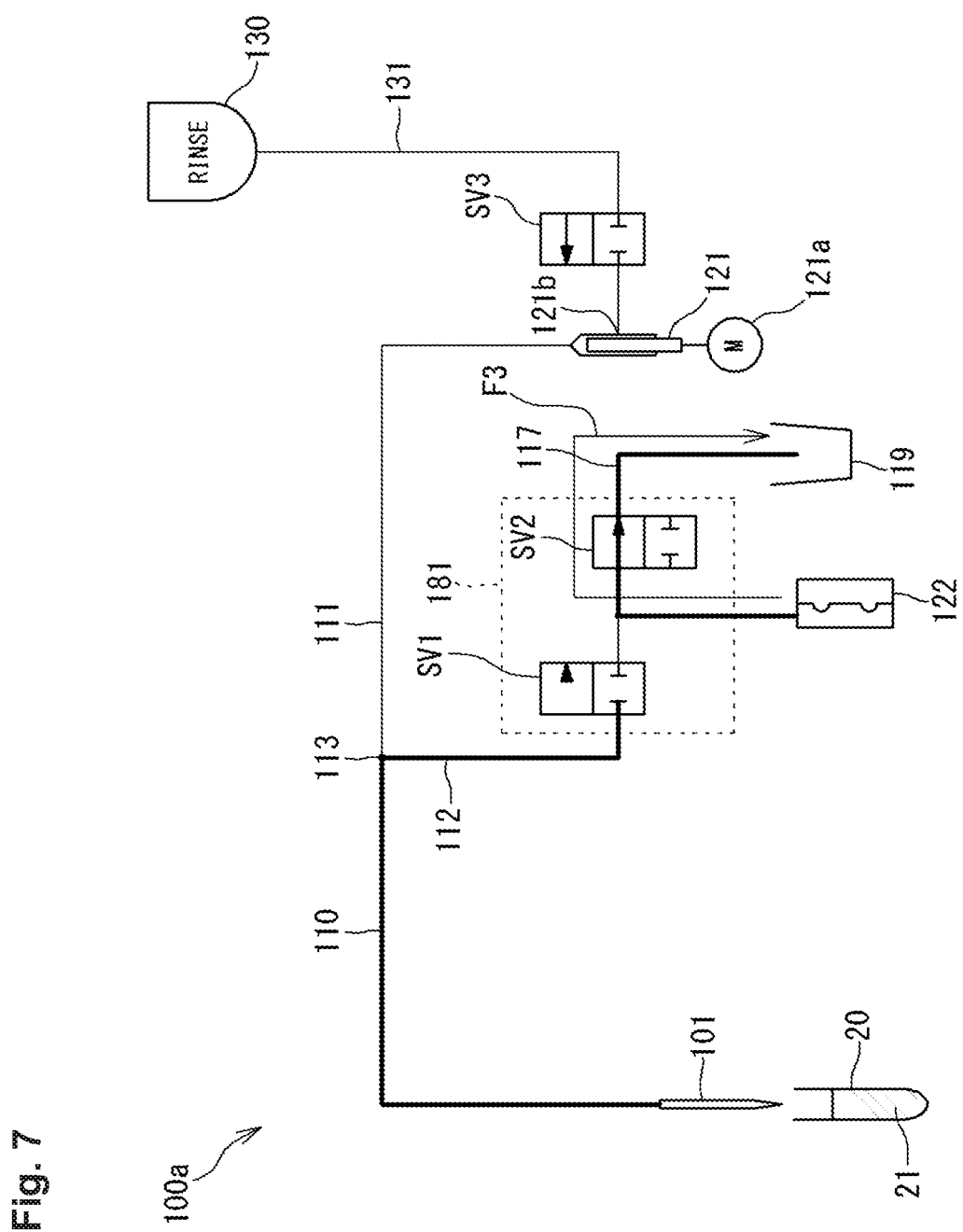
FIG. 7 is a flow circuit diagram further illustrating a first example for specimen aspiration in accordance with one or more embodiments.

In a step S14, the controller 200 opens the solenoid valve SV2, drives the second pump 122 to discharge a specimen, and causes a discharging force F3, such as is shown in FIG. 7. With the above described operation, the specimen in the second pump 122 is discharged to the drainage chamber 119.

As illustrated in the process flow diagram of FIG. 4, the controller 200 selectively drives the first pump 121 and the second pump 122 with different aspiration abilities; therefore, the controller 200 can easily handle different aspiration quantities of a specimen. Because a pump to be driven is selected by the controller 200, for example in response to the selected measurement mode, a proper pump can be selected and used and an appropriate quantity of a specimen can be aspirated according to the selected measurement mode providing clear advantages.

FIG. 4 illustrates selective operations of the first pump 121 and the second pump 122, and only one of the two pumps is driven in the illustrated condition. Thus, the controller 200 does not drive both the first pump 121 and the second pump 122 at the same time in the example illustrated in FIG. 4. The controller 200, however, may drive both the first pump 121 and the second pump 122 at the same time in other examples.

The aspirated specimen can be conveyed to the detector 102 or dispensed to a chamber in the main body 100. In a first example, the next process of the aspirated specimen may not necessarily be determined. Thus, the aspirated specimen may be conveyed to a section in the main body 100, which conducts determination and selection of the next appropriate process to the specimen. The specimen conveyance to a proper section in the main body 100 can be done by the first pump 121 or the second pump 122, or by a pump which is not illustrated in figures.

From a step S15 to a step S17, the controller 200 conducts an operation to clean the flow circuit 100a. These steps are the same for both the first and second measurement modes, and these steps are operated no matter which measurement mode is selected.

Figure 8:
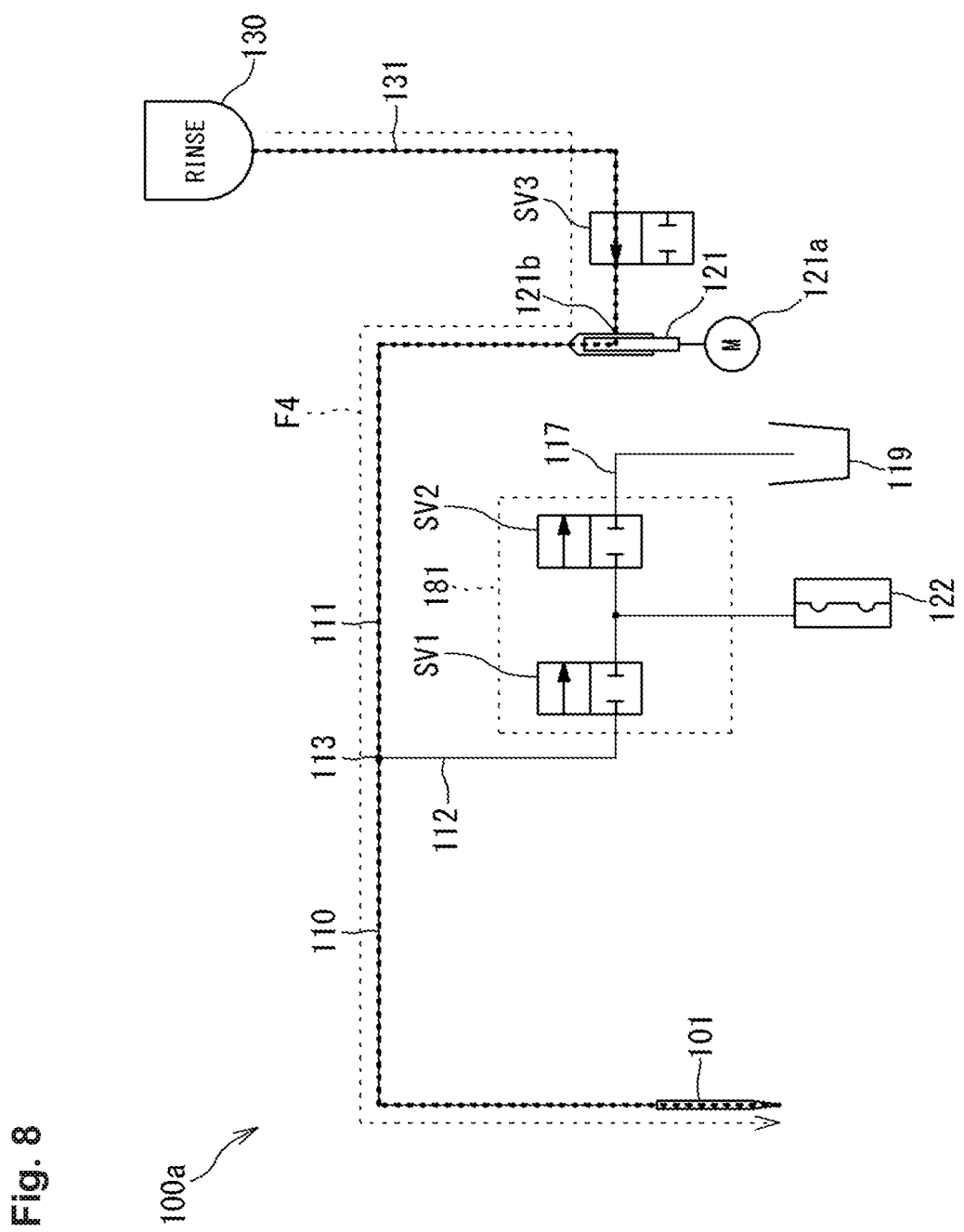
FIG. 8 is a flow circuit diagram further illustrating a first example for specimen aspiration in accordance with one or more embodiments.

In the step S15, the controller 200 opens the solenoid valve SV3. As illustrated in FIG. 8, application of a positive pressure causes a cleaning liquid flow F4, which sends cleaning liquid from the cleaning liquid container 130 to the flow path 131, the first pump 121, the first branched flow path 111, the main flow path 110, and the aspirator 101. The cleaning liquid flow F4 cleans the aspirator 101, the main flow path 110, the first branched flow path 111, and the first pump 121. In FIG. 8, flow paths, such as the main flow path 110, the first branched flow path 111 and the flow path 131, filled with cleaning liquid are illustrated with a bolded broken line. A bolded broken line in the flow circuit 100a in other figures also means it is filled with cleaning liquid.

Figure 9:
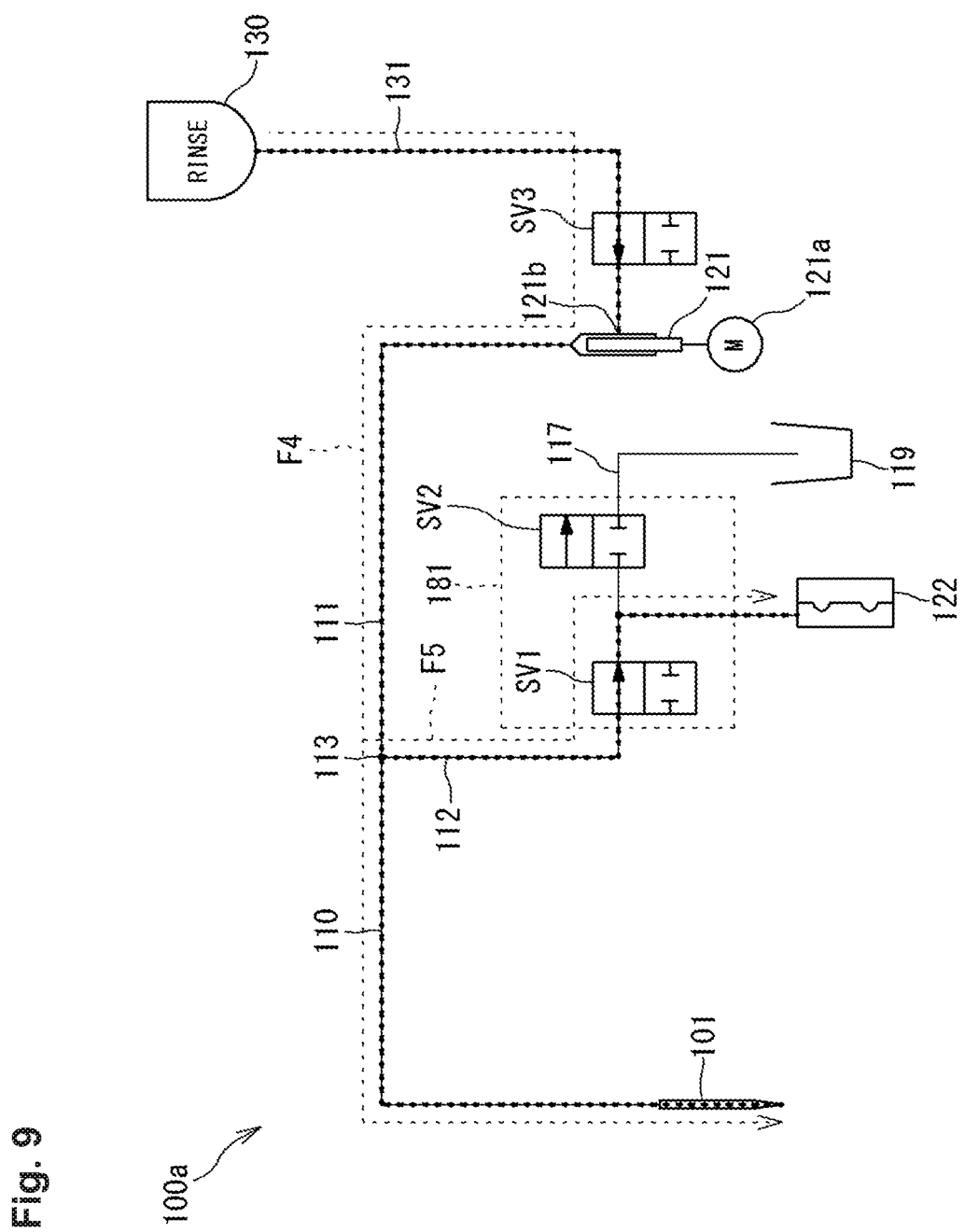
FIG. 9 is a flow circuit diagram further illustrating a first example for specimen aspiration in accordance with one or more embodiments.

In the step S16, the controller 200 opens the solenoid valve SV1, drives the second pump 122 to aspirate a specimen, and causes an aspiration force to be generated. As illustrated in FIG. 9, this aspiration force causes a cleaning liquid flow F5, which sends cleaning liquid from the branched part 113 to the second branched flow path 112 and the second pump 122. The cleaning liquid flow F5 cleans the second branched flow path 112 and the second pump 122.

Figure 10:
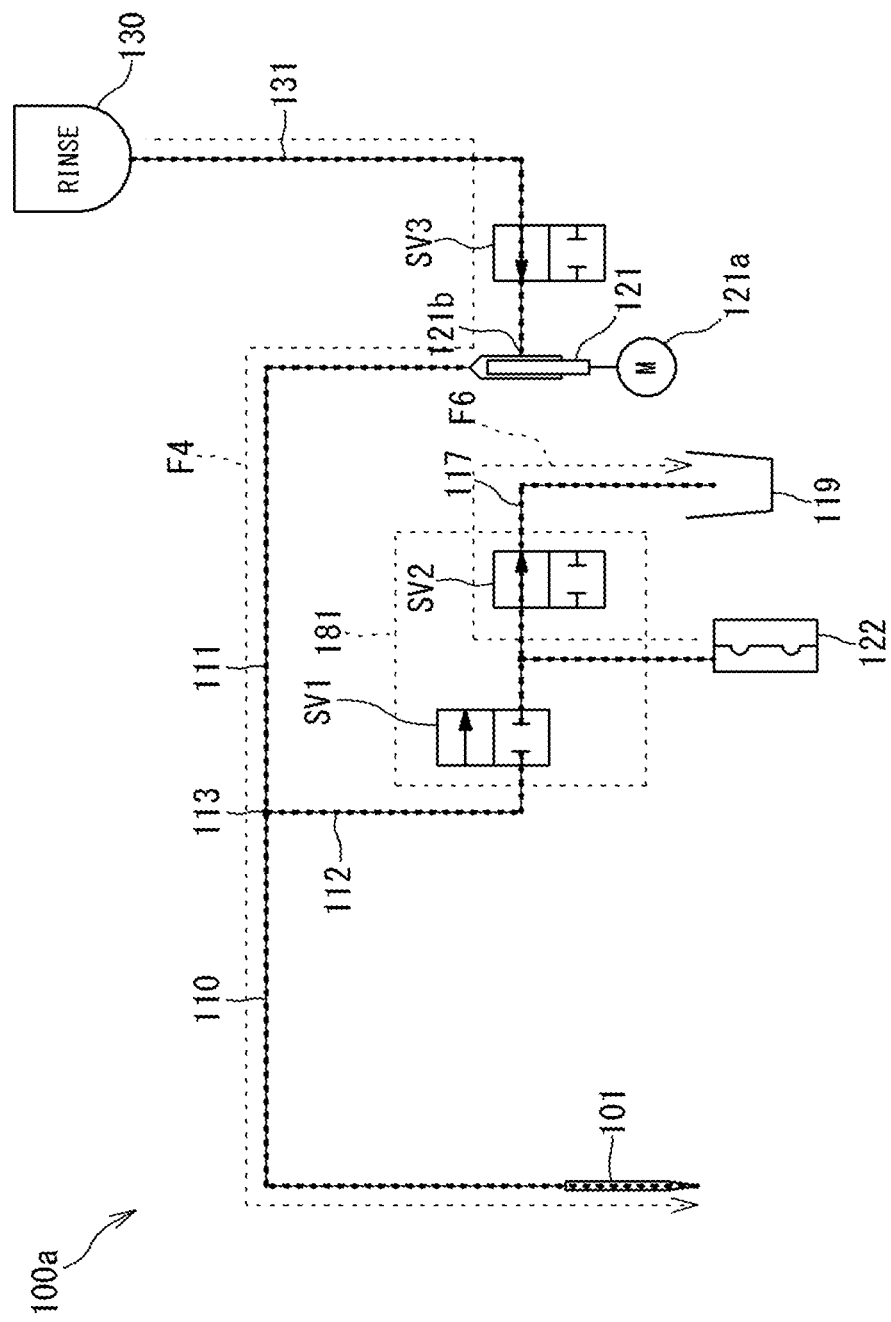
FIG. 10 is a flow circuit diagram further illustrating a first example for specimen aspiration in accordance with one or more embodiments.

In the step S17, the controller 200 closes the solenoid valve SV1, opens the solenoid valve SV2, and drives the second pump 122 to discharge a specimen. As illustrated in FIG. 10, discharging drive of the second pump 122 causes a discharging flow F6, which discharges a cleaning liquid in the second pump 122 to the drainage chamber 119.

In the step S15 and the step S16, both the first branched flow path 111 and the second branched flow path 112 are cleaned. When the first pump 121 aspirates a specimen, the specimen only flows into the first branched flow path 111 and does not flow into the second branched flow path 112. The specimen, however, may adhere to the side of the second branched flow path 112 around the branched part 113. Thus, even when the first pump 121 aspirates a specimen, not only the first branched flow path 111 but also the second branched flow path 112 are cleaned, which leads to substantially thorough cleaning around the branched part 113 and to prevention of improper specimen conveyance. Similarly, when the second pump 122 aspirates a specimen, both the second branched flow path 112 and the first branched flow path 111 are cleaned. Thus, the areas around branched part 112 can be substantially thoroughly cleaned and leftover specimen may be prevented from being conveyed improperly.

When the step S17 is completed, as illustrated in FIG. 10, the main flow path 110, the first branched flow path 111 and the second branched flow path 112 are filled with cleaning liquid. The next aspiration of a specimen is conducted with the flow paths filled condition. When the first branched flow path 111 and the second branched flow path 112 are filled with cleaning liquid, there is no air space in the flow paths, which is an efficient solution to avoid a damper effect by the air space.

[2.2 Second Example of Specimen Aspiration]

Figure 11:
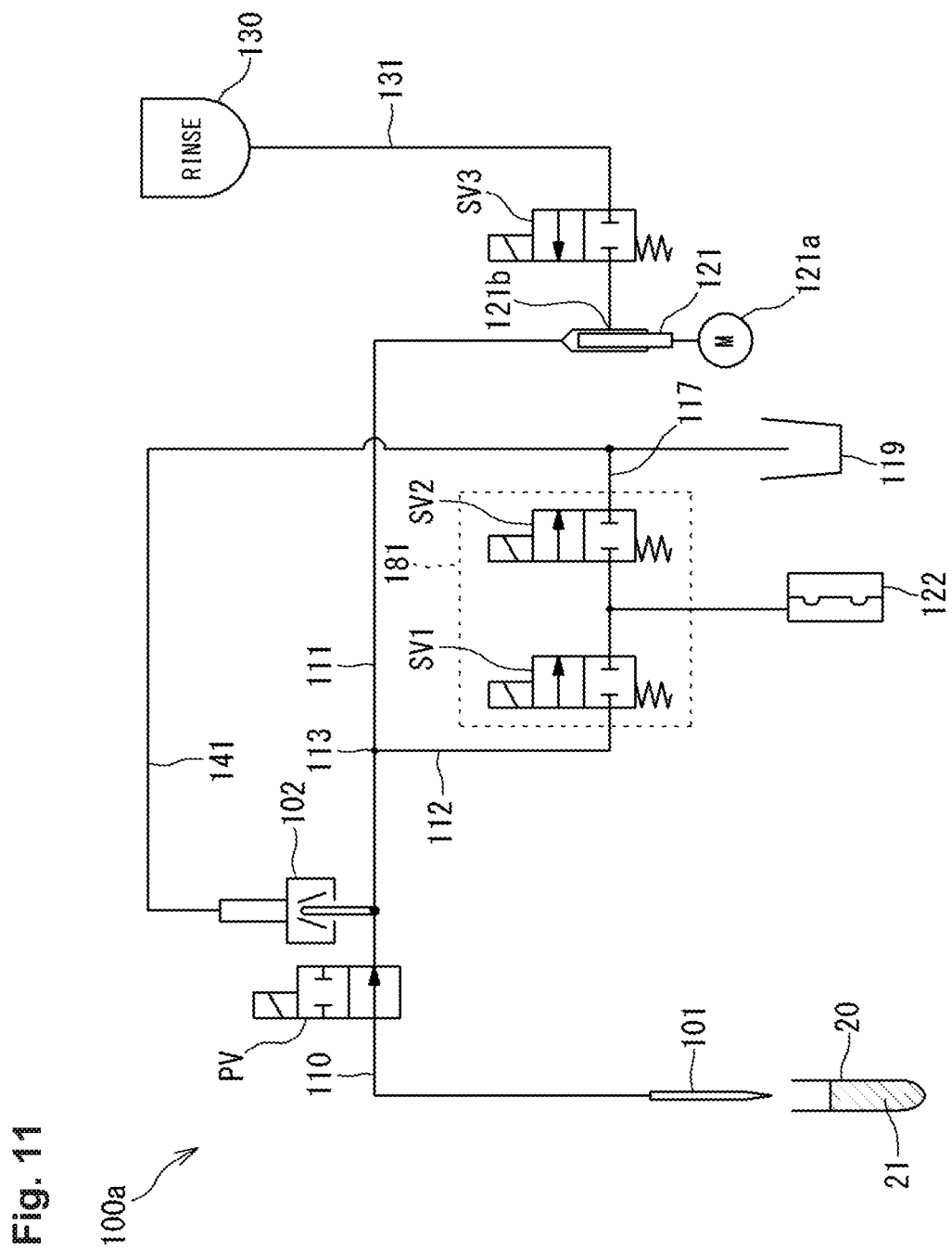
FIG. 11 is a flow circuit diagram illustrating a second example for specimen aspiration in accordance with one or more embodiments.

FIG. 11 illustrates a second example of the flow circuit 100a. In a second example of the flow circuit 100a, the detector 102 is connected to the main flow path 110. A pinch valve PV to open and close the main flow path 110 is provided between the detector 102 and the aspirator 101. The pinch valve PV is normally opened. A valve to open and close the main flow path 110 may be other than the pinch valve PV. The pinch valve PV is configured to open and close the main flow path 110 by changing the structure of the main flow path 110 from outside, and a specimen does not flow into the pinch valve PV. Therefore, since particles in the specimen do not adhere to the pinch valve PV, cleaning of the valve is easy, and a leftover specimen may be prevented from being improperly conveyed. The configuration of a second example of the flow circuit 100a other than the detector 102 and the pinch valve PV are substantially the same as those of a first example of the flow circuit 100a. Note that a flow path 141 connects the detector 102 and the drainage chamber 119.

Figure 12:
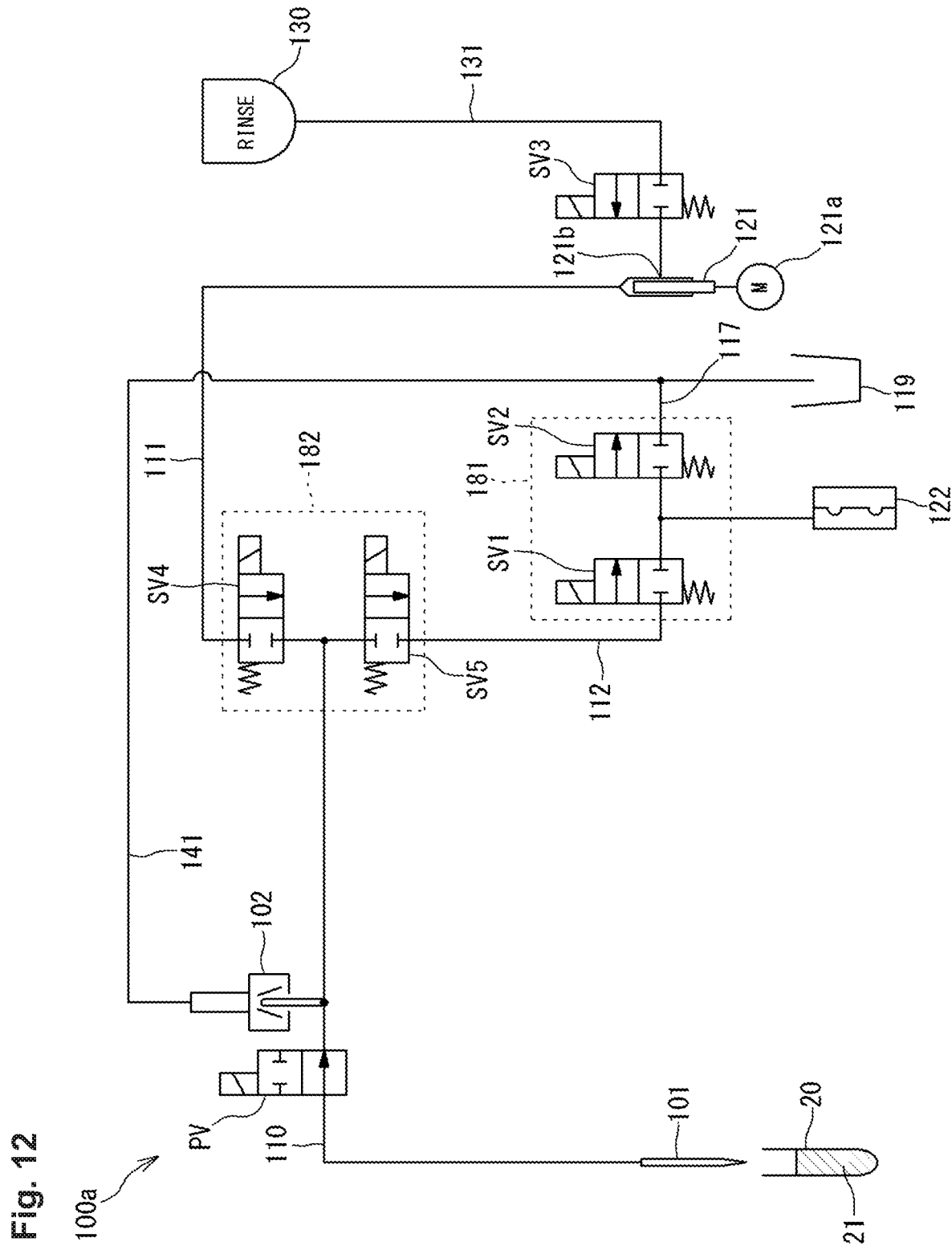
FIG. 12 is a flow circuit diagram further illustrating a second example for specimen aspiration in accordance with one or more alternative or additional embodiments.

As illustrated in FIG. 12, the three-way switching valve 182 can be added to the flow circuit 100a in FIG. 11. The three-way switching valve 182 is substantially the same as the one of FIG. 3.

Figure 13:
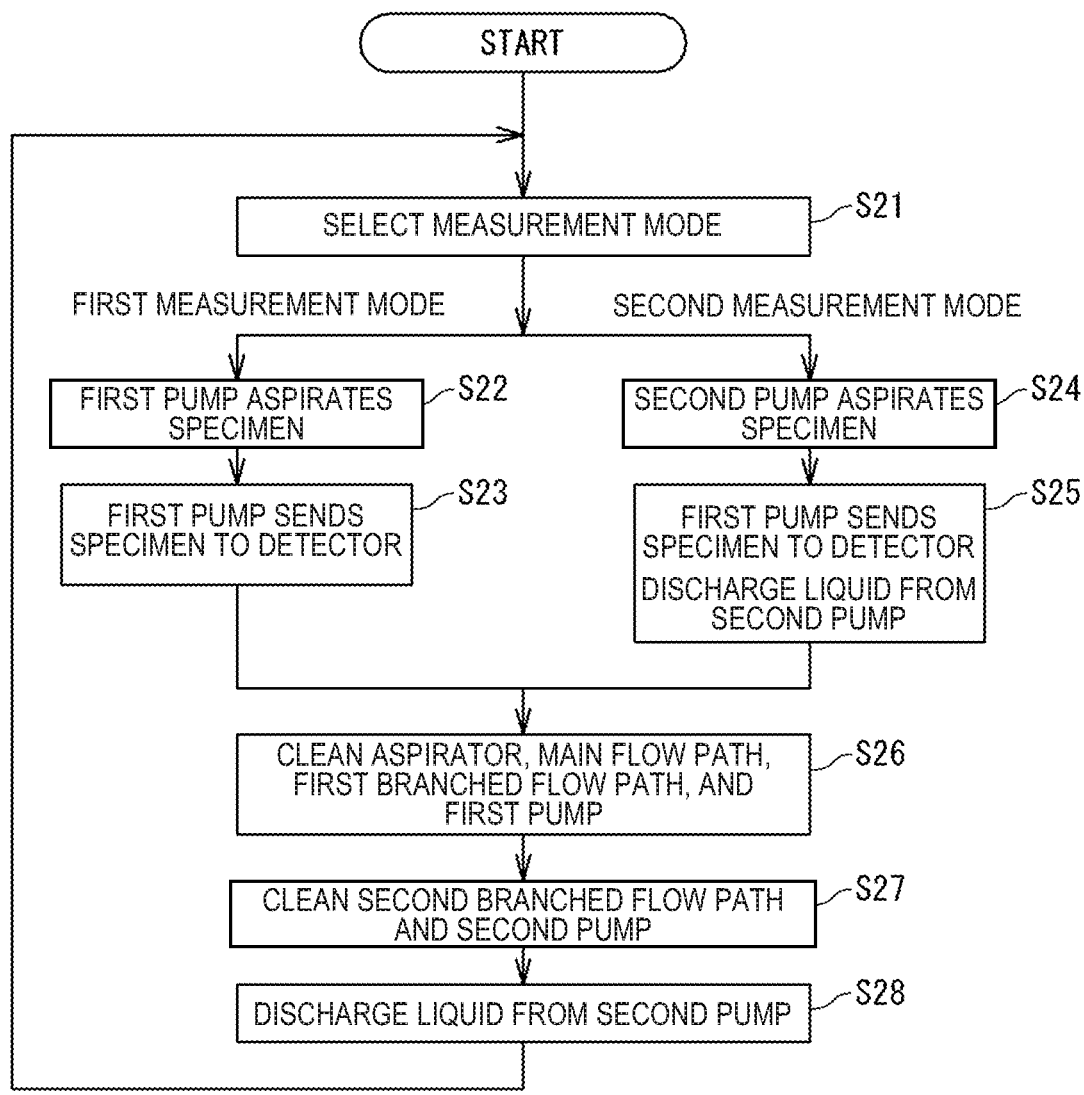
FIG. 13 is a process flow diagram illustrating operational aspects of specimen aspiration for a flow circuit of a second example in accordance with one or more embodiments.

The controller 200 controls the flow circuit 100a illustrated in FIG. 11 and FIG. 12 in a way, such as is shown in FIG. 13. Similar to the step S11, the controller 200 receives a measurement mode selection from a user in a step S21. Similar to the step S11, a plurality of measurement modes set includes the first measurement mode and the second measurement mode. The first measurement mode and the second measurement mode use different pumps to aspirate a specimen, such as the first pump 121 and the second pump 122.

Figure 14:
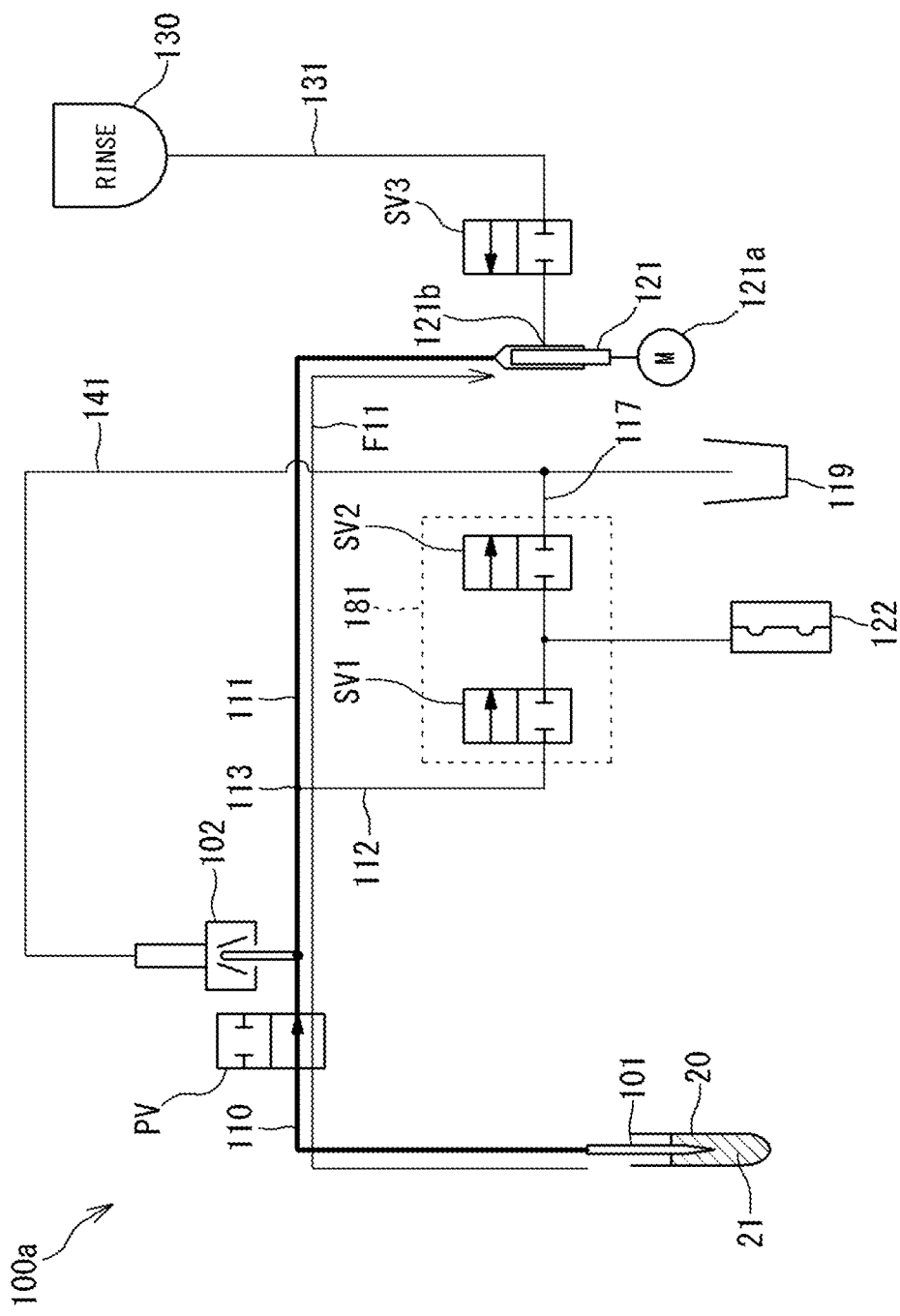
FIG. 14 is a flow circuit diagram further illustrating a second example for specimen aspiration in accordance with one or more embodiments.

When the first measurement mode is selected, the controller 200 drives the first pump 121 to aspirate a specimen and causes an aspiration force F11, such as is shown in FIG. 14, to be generated in a step S22. The pinch valve PV is opened in the above described condition. The aspiration force F11 caused by the first pump 121 aspirates the specimen 21 by the aspirator 101. The aspirated specimen 21 flows into the main flow path 110 and the first branched flow path 111. The first pump 121 stops once a certain quantity of a specimen is aspirated.

Figure 15:
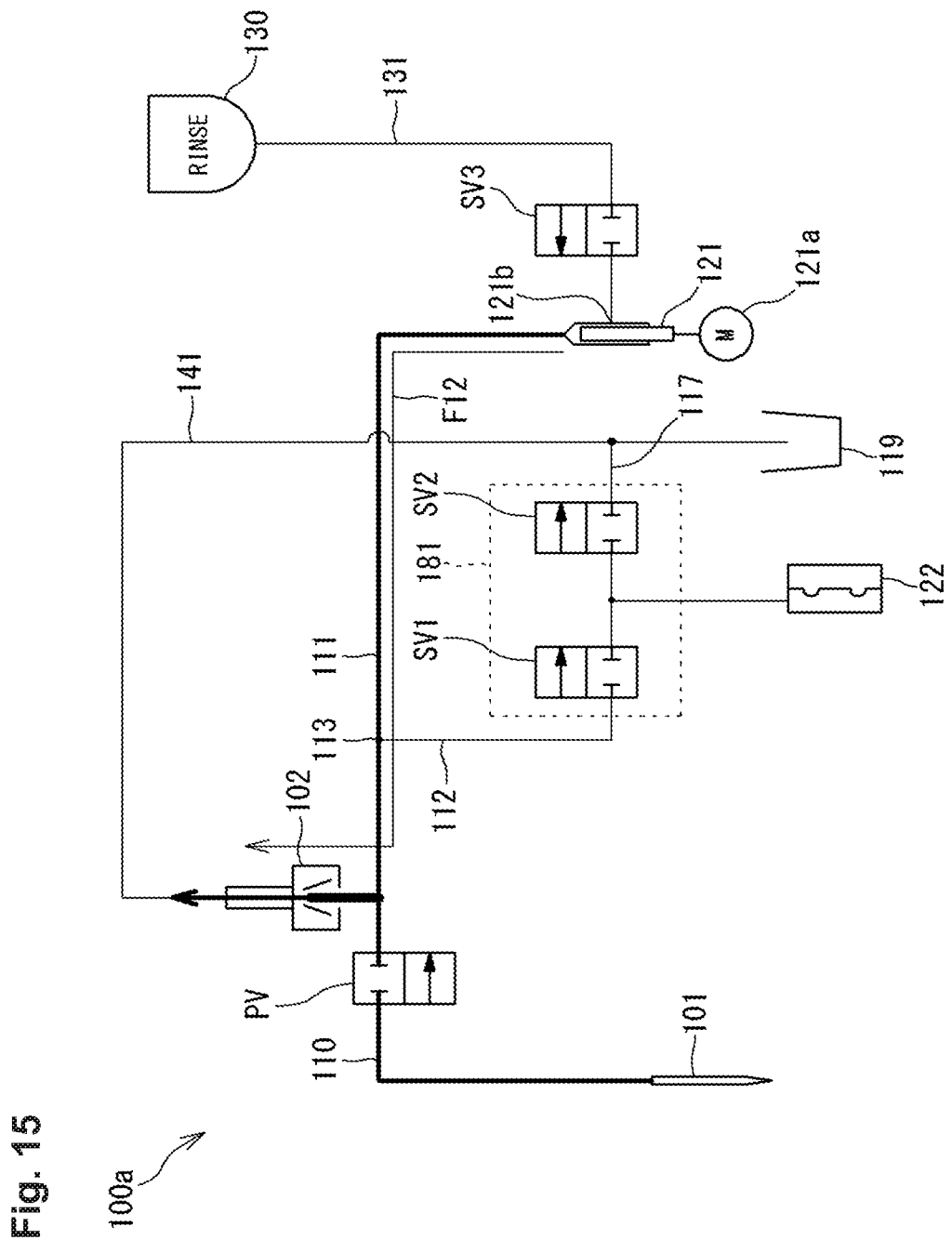
FIG. 15 is a flow circuit diagram further illustrating a second example for specimen aspiration in accordance with one or more embodiments.

In a step S23, the controller 200 closes the pinch valve PV, drives the first pump 121 to discharge a specimen, and causes a discharging force F12, such as is shown in FIG. 15. The discharging force F12 caused by the first pump 121 sends a specimen in the main flow path 110 to the detector 102. A specimen in the first branched flow path 111 also may be sent to the detector 102. The detector 102 measures the specimen and sends a measured value to the controller 200.

Since the first pump 121 in one or more embodiments is a syringe pump, the first measurement mode is suitable to accurately aspirate a first quantity of a specimen that is relatively small. Also, because the first pump 121 in one or more embodiments can aspirate a variable quantity of a specimen, the first measurement mode may be a measurement mode in which a variable quantity of a specimen may be aspirated.

Figure 16:
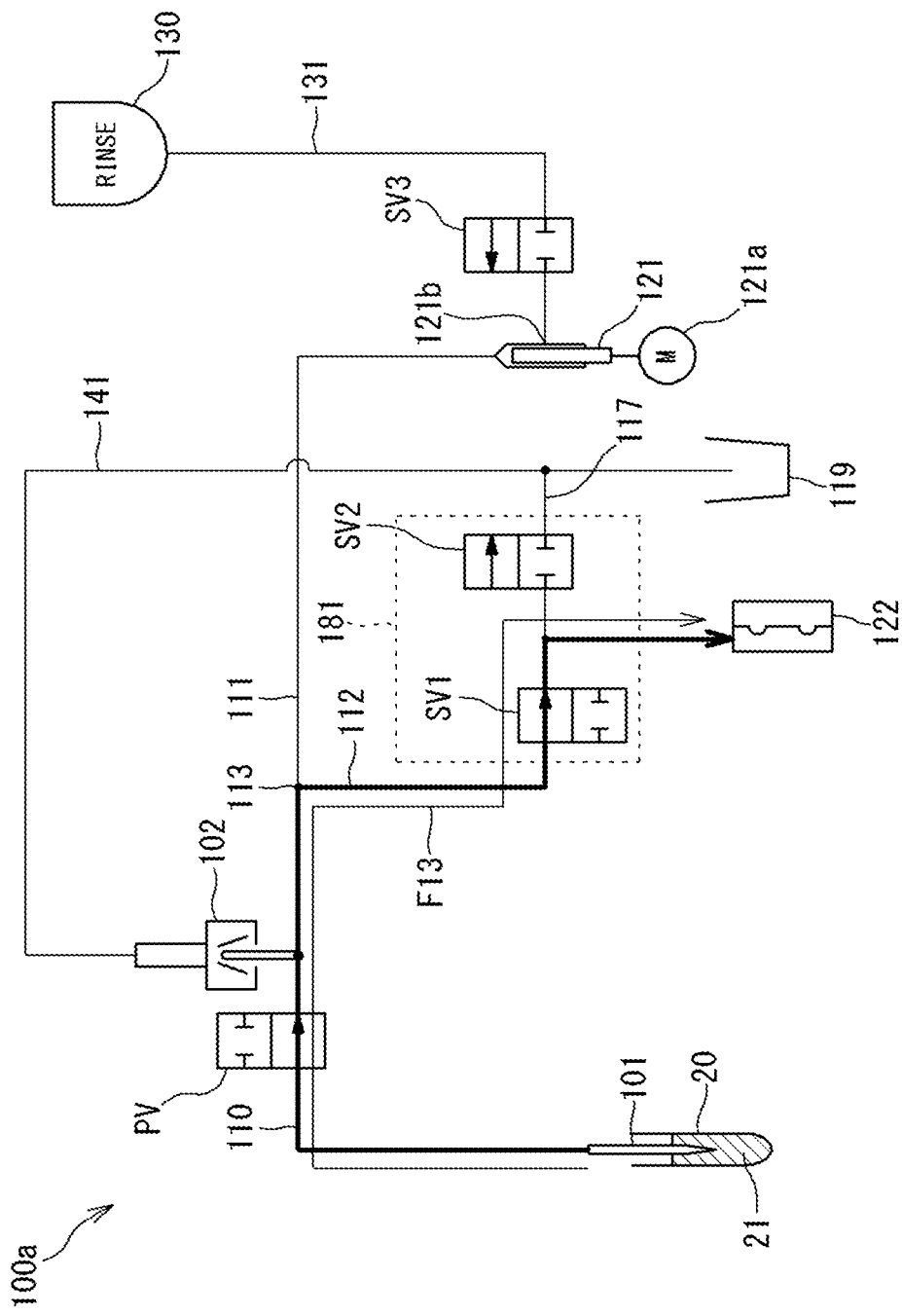
FIG. 16 is a flow circuit diagram further illustrating a second example for specimen aspiration in accordance with one or more embodiments.

When the second measurement mode is selected, the controller 200 drives the second pump 122 to aspirate a specimen and causes an aspiration force F13, such as is shown in FIG. 16, in a step S24. The pinch valve PV and the solenoid valve SV1 are opened with this condition. The aspiration force F13 caused by the second pump 122 aspirates the specimen 21 by the aspirator 101. The aspirated specimen 21 flows into the main flow path 110 and the second branched flow path 112. Once a certain quantity of a specimen is aspirated, the controller 200 closes the solenoid valve SV1 and stops aspiration of a specimen by the second pump 122.

The second pump 122 in one or more embodiments is a diaphragm pump, whose aspiration ability is higher than that of the first pump 121. Therefore, the second measurement mode is suitable to promptly aspirate a second quantity of a specimen, which is larger quantity than the first quantity of a specimen. Also, because the second pump 122 in one or more embodiments aspirates a fixed quantity of a specimen, the second measurement mode may be a measurement mode in which a fixed quantity of a specimen may be aspirated.

Figure 17:
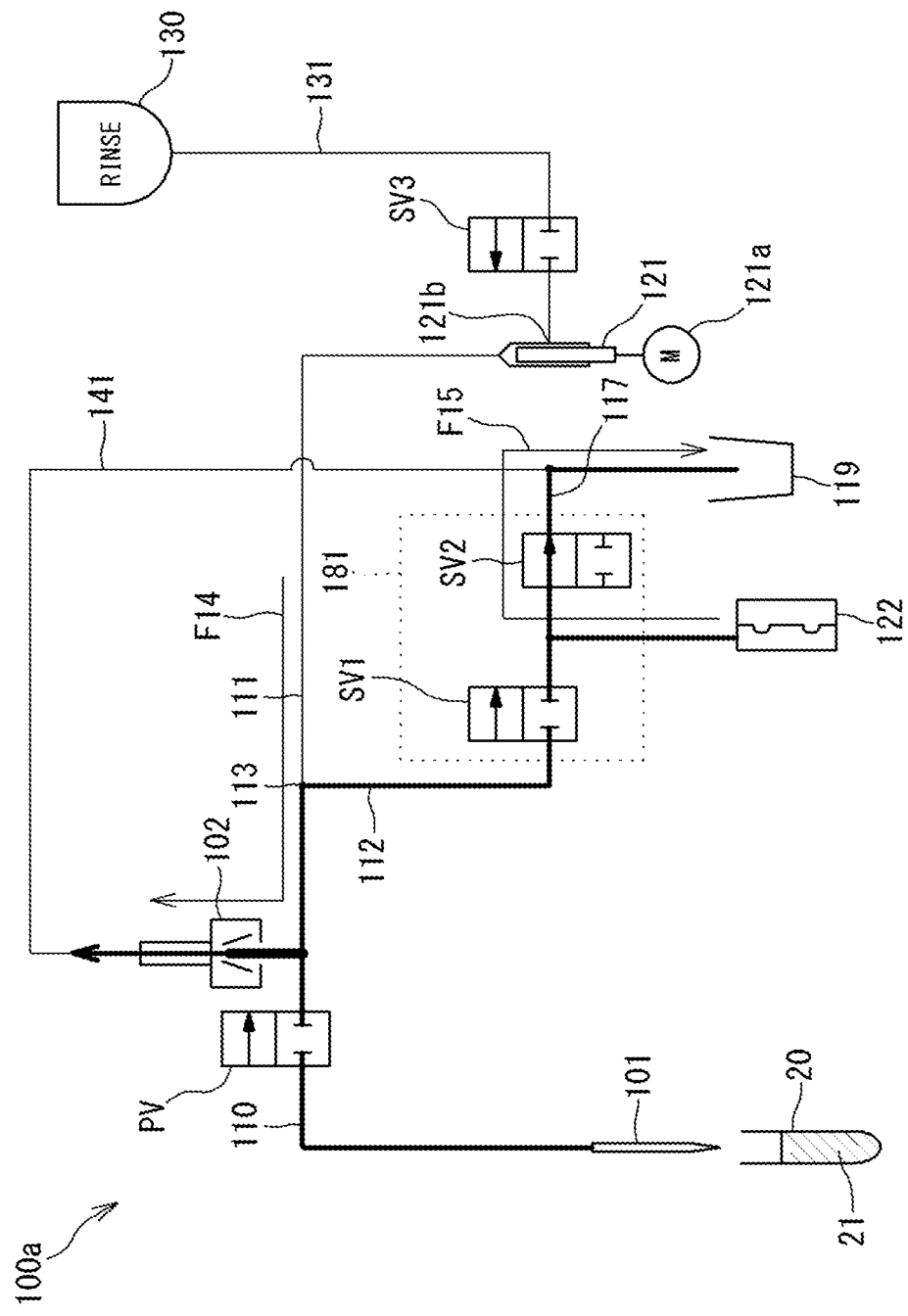
FIG. 17 is a flow circuit diagram further illustrating a second example for specimen aspiration in accordance with one or more embodiments.

In a step S25, the controller 200 opens the pinch valve PV, drives the first pump 121 to discharge a specimen, and causes a discharging force F14, such as in FIG. 17. The discharging force F14 caused by the first pump 121 sends a specimen in the main flow path 110 to the detector 102. The detector 102 measures the specimen and sends a measured value to the controller 200. The second pump 122 aspirates the specimen in the main flow path 110, but the first pump 121 conveys the specimen to the detector 102. By using the first pump 121, the accurate quantity of a specimen can be sent to the detector 102 with constant speed. Conveying a specimen with constant speed enables the detector 102 to conduct stable measurements.

In the step S25, the controller 200 opens the solenoid valve SV2, drives the second pump 122 to discharge a specimen, and causes a discharging force F15, such as is shown in FIG. 17, to discharge a specimen in the second pump 122 to the drainage chamber 119. The discharging operation by the second pump 122 can be conducted at the same time when the detector 102 conducts measurement of a specimen or at the different time.

As illustrated in the process flow diagram of FIG. 13, the controller 200 selects and drives either the first pump 121 and the second pump 122 with different aspiration abilities; therefore, the controller 200 can easily deal with aspiration of different quantities of a specimen. Since the pump to be operated is selected in response to the selected measurement mode, a proper quantity of a specimen can be aspirated by a proper pump according to the selected measurement mode. On the other hand, conveying a specimen to the detector 102 is conducted regularly by the first pump 121, which can send a specimen with constant speed, despite a pump to be used to aspirate a specimen. The second pump 122 or other pumps than the first pump 121 and the second pump 122 may convey a specimen to the detector 102.

From a step S26 to a step S28, the controller 200 cleans the flow circuit 100a. Steps from the step S26 to the step S28 are the same for the first measurement mode and the second measurement mode, and these steps are conducted no matter which measurement mode is selected. The cleaning steps from the step S26 to the step S28 are substantially the same as those of the step S15 to the step S17 in FIG. 4, and thus a detailed description will be omitted for brevity. In a second example of specimen aspiration, both the first branched flow path 111 and the second branched flow path 112 are cleaned regardless of which of the first pump 121 or the second 122 aspirates a specimen.

The operations of the flow circuit 100a in a second example, which are not described in this section are substantially the same as operations of the flow circuit 100a in a first example.

[2.3 Third Example of Specimen Aspiration]

Figure 18:
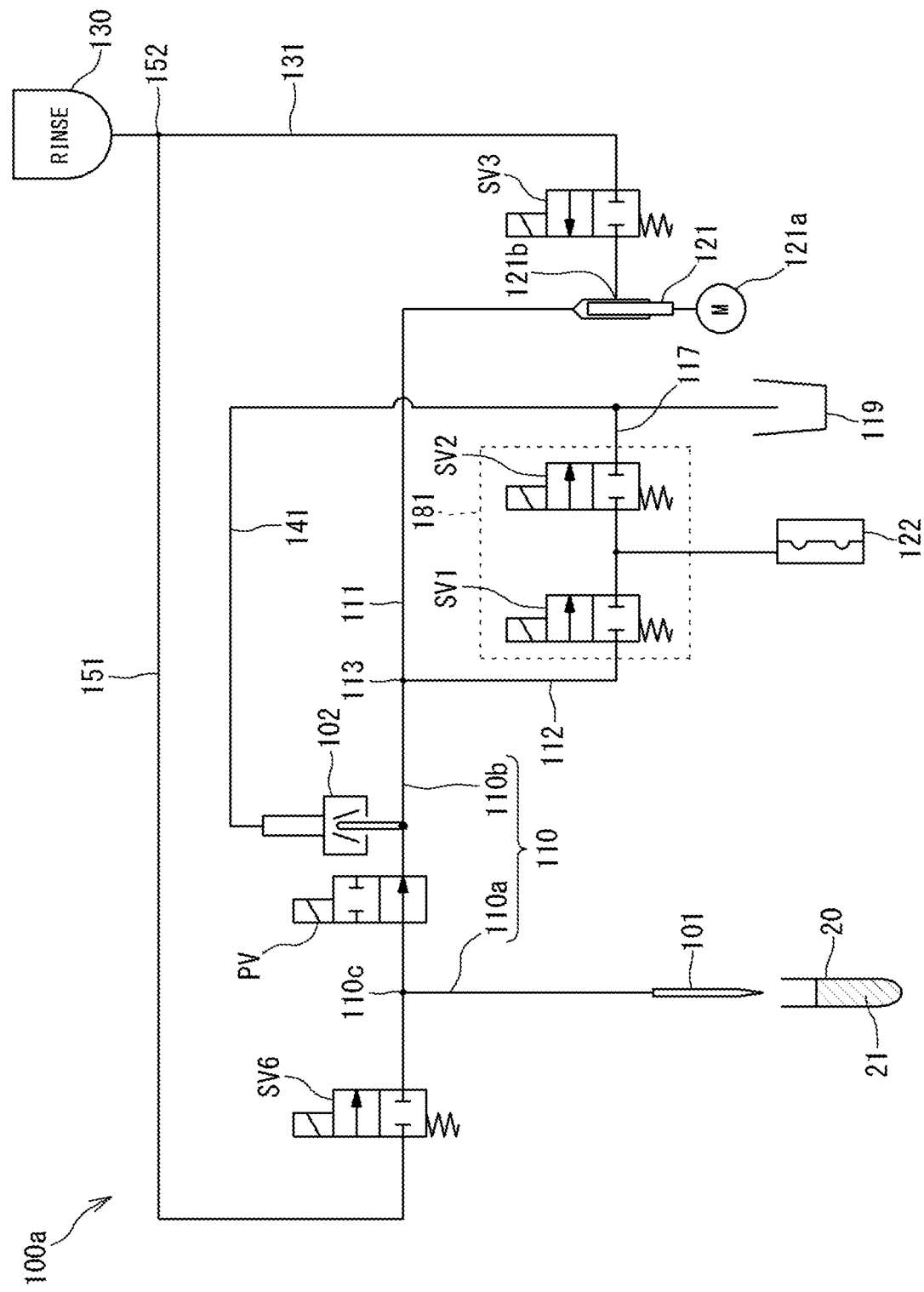
FIG. 18 is a flow circuit diagram illustrating a third example for specimen aspiration in accordance with one or more embodiments.

FIG. 18 illustrates a third example of the flow circuit 100a. In a third example of the flow circuit 100a, a flow path 151 is connected to the main flow path 110. One end of the flow path 151 is connected to a halfway point 152 of the flow path 131 connected to the cleaning liquid container 130, and the other end of the flow path 151 is connected to a halfway point 110c of the main flow path 110. The other end of the flow path 151 is connected to the main flow path 110 between the pinch valve PV and the aspirator 101. In other words, the halfway point 110c is located at the main flow path 110 between the pinch valve PV and the aspirator 101. In the main flow path 110, a section on a side of the aspirator 101 with respect to the halfway point 110c is referred to as a first main flow path 110a, and a section on a side of the first pump 121 and the second pump 122 with respect to the halfway point 110c is referred to as a second main flow path 110b. More specifically, the main flow path 110 includes the first main flow path 110a, which is the section from the halfway point 110c to the aspirator 101, and the second main flow path 110b, which is the section from the halfway point 110c to the branched part 113.

A solenoid valve SV6 is located in the middle of the flow path 151 in a third example of the flow circuit 100a. The solenoid valve SV6 is normally closed. The structures other than the flow path 151 and the solenoid valve SV6 in a third example of the flow circuit 100a are substantially the same as structures of a first example and a second example of the flow circuit 100a.

Figure 19:
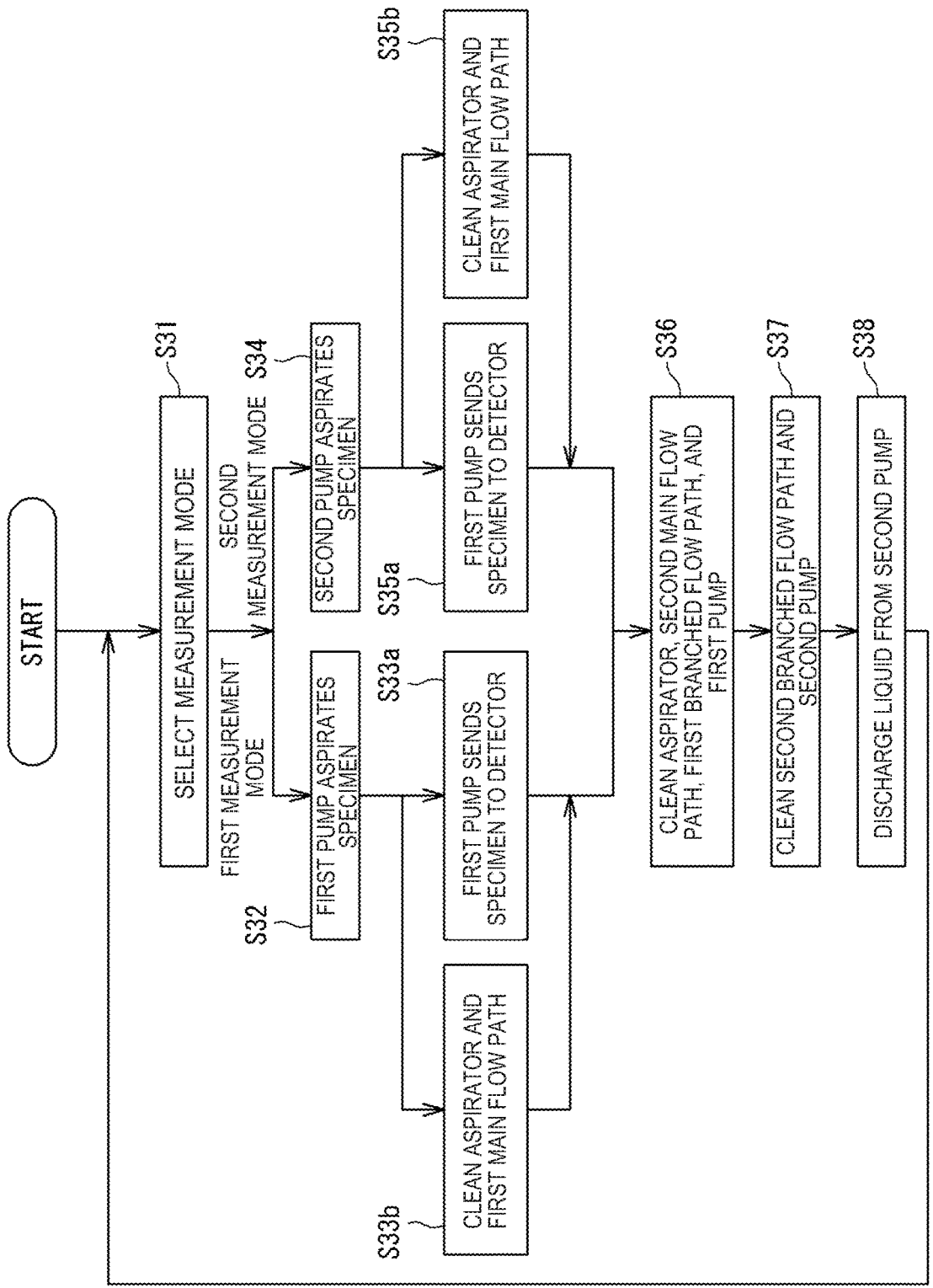
FIG. 19 is a process flow diagram illustrating operational aspects of specimen aspiration for a flow circuit of a third example in accordance with one or more embodiments.

The controller 200 controls the flow circuit 100a illustrated in FIG. 18 in a way, such as is shown in FIG. 19. In a step S31, the controller 200 receives a measurement mode selection by a user as well as the step S11. A plurality of measurement modes set includes the first measurement mode and the second measurement mode. The first measurement mode and the second measurement mode use different pumps to aspirate a specimen, such as the first pump 121 and the second pump 122.

When the first measurement mode is selected, the controller 200 drives the first pump 121 and causes the aspirator 101 to aspirate the specimen 21 in a step S32. In a step S33a, the controller 200 drives the first pump 121 to discharge a specimen and sends the specimen in the main flow path 110 to the detector 102.

Figure 20:
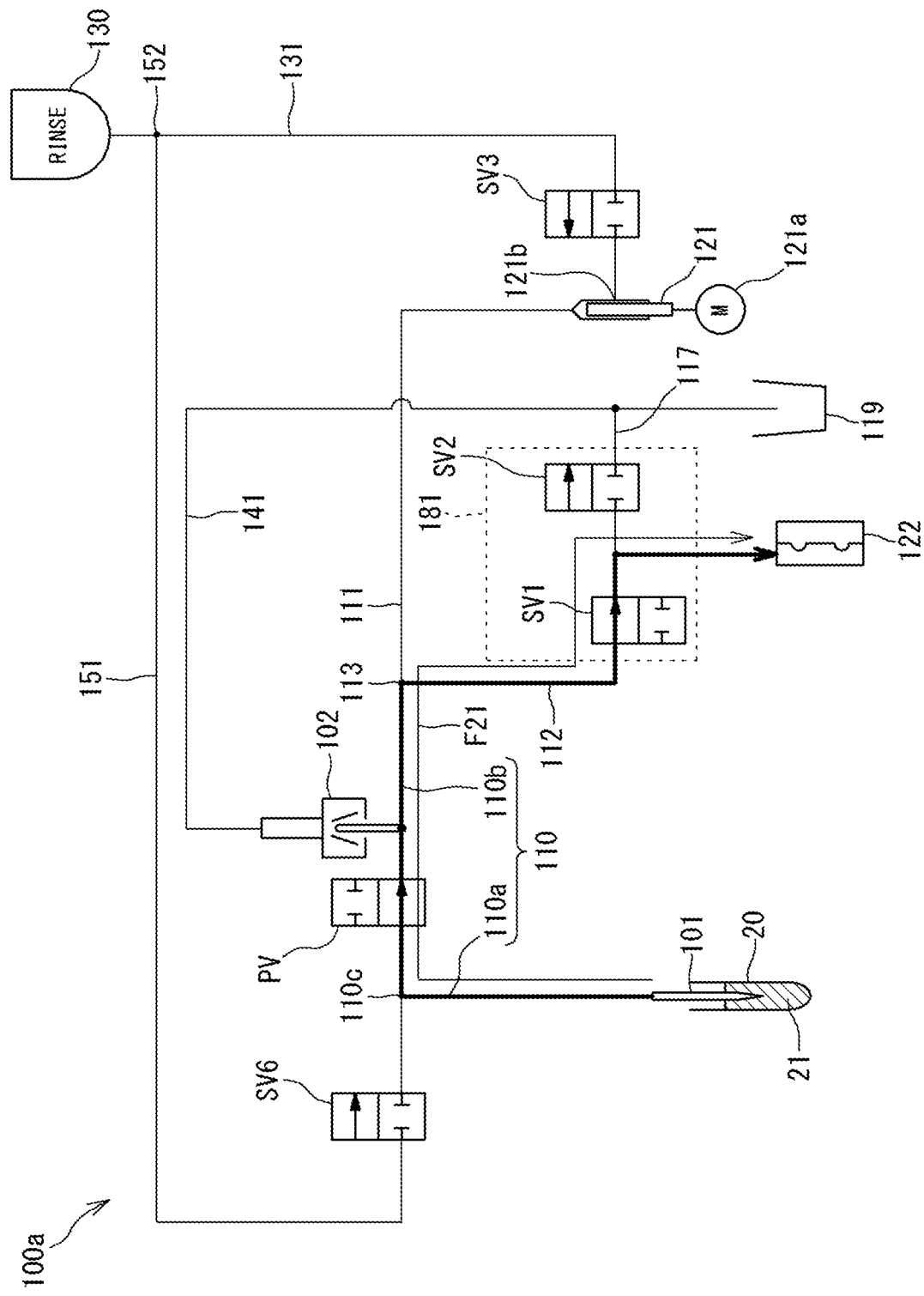
FIG. 20 is a flow circuit diagram further illustrating a third example for specimen aspiration in accordance with one or more embodiments.

When the second measurement mode is selected, the controller 200 drives the second pump 122 to aspirate a specimen and causes an aspiration force F21, such as is shown in FIG. 20, in a step S34. The pinch valve PV and the solenoid valve SV1 are opened in this condition. An aspiration force F21 caused by the second pump 122 aspirates the specimen 21 by the aspirator 101. The aspirated specimen 21 flows into the main flow path 110 and the second branched flow path 112. Once a certain quantity of a specimen is aspirated, the controller 200 closes the solenoid valve SV1 and stops aspiration of a specimen by the second pump 122.

Figure 21:
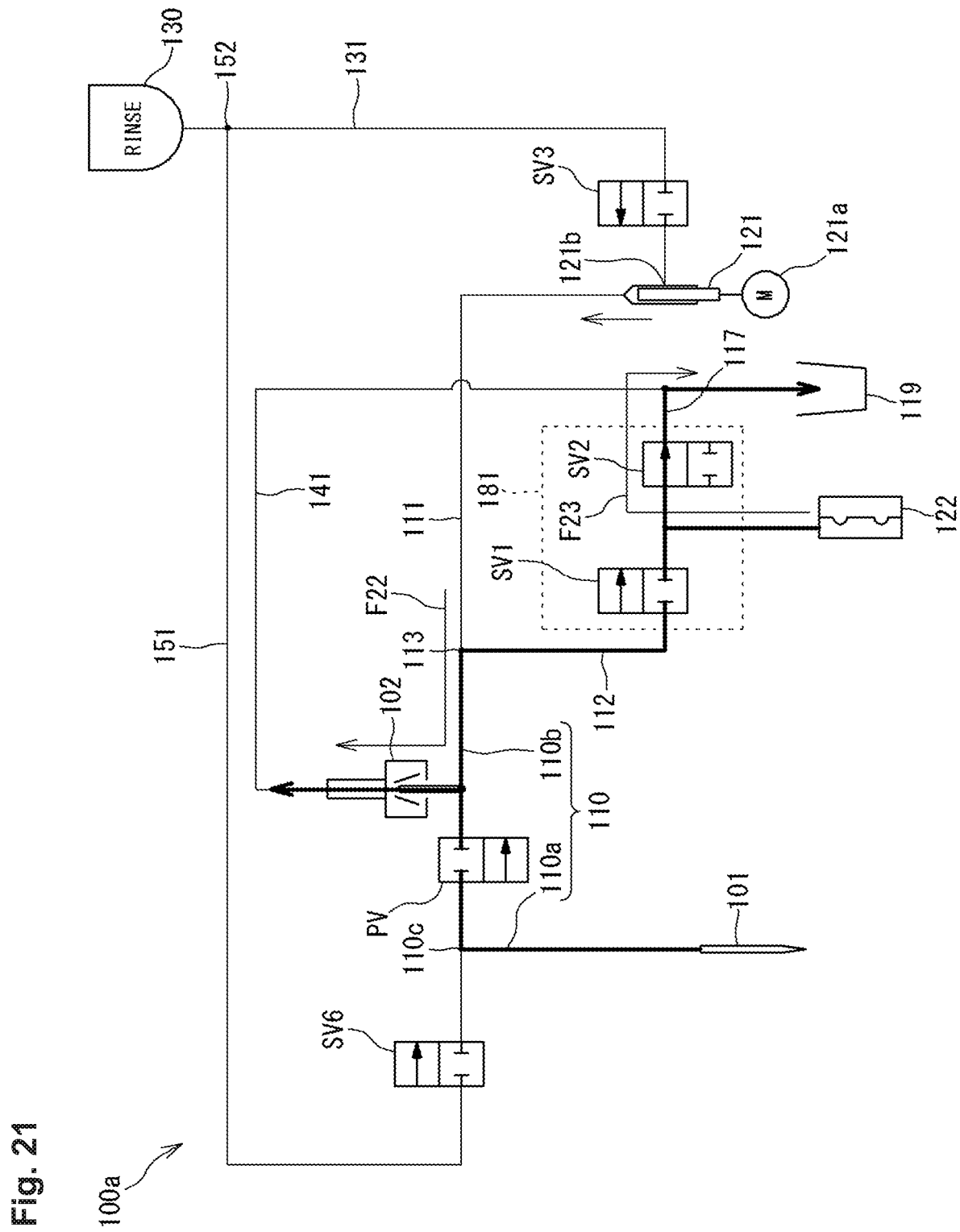
FIG. 21 is a flow circuit diagram further illustrating a third example for specimen aspiration in accordance with one or more embodiments.

In a step S35a, the controller 200 closes the pinch valve PV, drives the first pump 121 to discharge a specimen, and causes a discharging force F22, such as is shown in FIG. 21. The discharging force F22 caused by the first pump 121 sends a specimen in the main flow path 110 to the detector 102. The detector 102 measures the specimen and sends a measured value to the controller 200.

In the step S35a, the controller 200 opens the solenoid valve SV2, drives the second pump 122 to discharge, and causes a discharging force F23 illustrated in FIG. 21, which discharges a specimen in the second pump 122 to the drainage chamber 119. The discharging operation by the second pump 112 can be conducted at the same time when the detector 102 measures a specimen or at different time.

Figure 22:
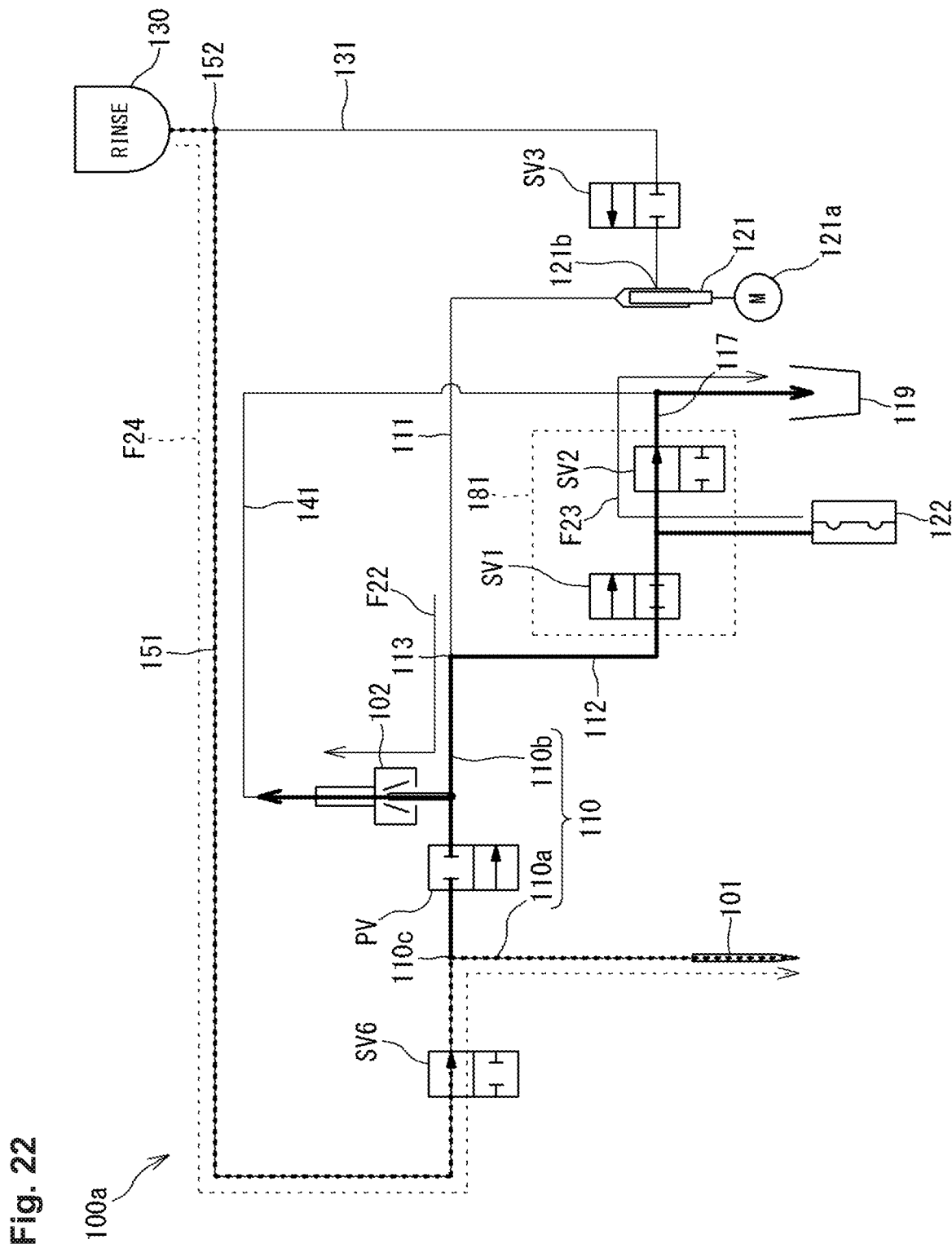
FIG. 22 is a flow circuit diagram further illustrating a third example for specimen aspiration in accordance with one or more embodiments.

In a step S33b and a step S35b of a third example, the aspirator 101 and the first main flow path 110a can be cleaned while a specimen is being sent to the detector 102. In the step S33b and the step S35b, the controller 200 opens the solenoid valve SV6, such as is shown in FIG. 22. Under the above described condition, cleaning liquid has a positive pressure, and a cleaning liquid flow F24 is caused to send cleaning liquid from the cleaning liquid container 130 to the flow path 151, the solenoid valve SV6, and the first main flow path 110a. The cleaning liquid flow F24 cleans the aspirator 101 and the first main flow path 110a. In a third example, the pinch valve PV divides the main flow path 110 into a side of the detector 102 and a side of the aspirator 101. With the main flow path 110 divided as described, measuring a specimen by the detector 102 and cleaning the aspirator 101 can be conducted at the same time and overall operation time can be reduced. Measuring a specimen conducted by the detector 102 and cleaning the aspirator 101, however, may be conducted at different time.

From a step S36 to a step S38, the controller 200 cleans the flow circuit 100a. The steps from the step S36 and the step S38 are the same for the first measurement mode and the second measurement mode, and the steps are conducted no matter which measurement mode is selected. The cleaning operations from the step S36 to the step S38 are substantially the same as those from the step S15 to the step S17 illustrated in FIG. 4 and a description will be omitted for brevity. In a third example, the aspirator 101 and the first main flow path 110a are already cleaned in the steps from the step S33b and the step S35b; therefore, the cleaning time at the step S36 is reduced and the cleaning efficiency improves.

The operations of the flow circuit 100a in a third example, which are not described in this section, are substantially the same as operations of the flow circuit 100a in a second example.

[2.4 Fourth Example of Specimen Aspiration]

Figure 23:
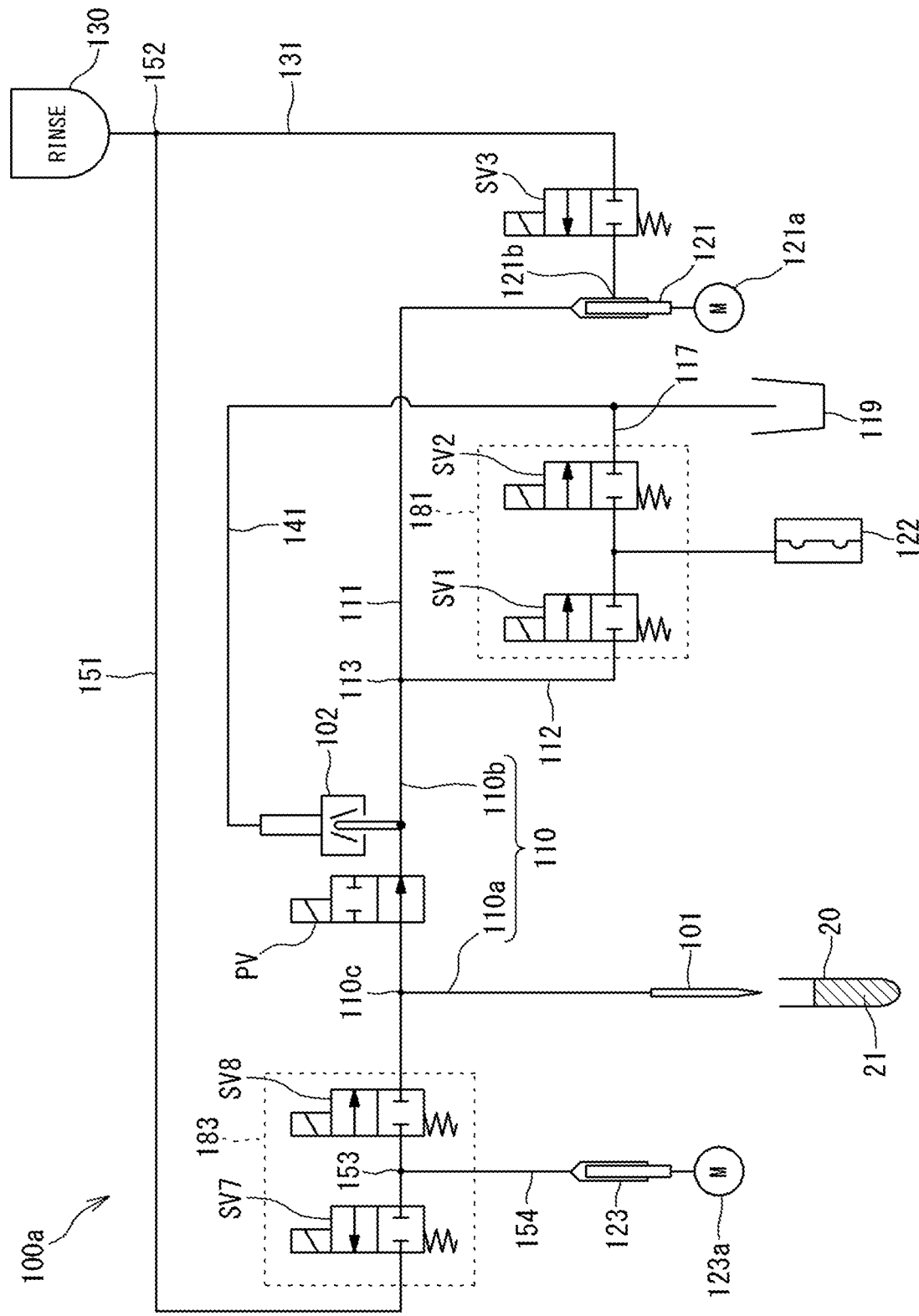
FIG. 23 is a flow circuit diagram illustrating a fourth example for specimen aspiration in accordance with one or more embodiments.

FIG. 23 illustrates a fourth example of the flow circuit 100a. In a fourth example of the flow circuit 100a includes a three-way solenoid valve or a three-way switching valve 183 in the flow path 151 of a third example. The three-way switching valve 183 is connected to a third pump 123 via a flow path 154. The three-way switching valve 183 includes a solenoid valve SV7 and a solenoid valve SV8, and both solenoids valves are normally closed. The third pump 123 is connected to the flow path 151 at a halfway point 153 between the solenoid valve SV7 and the solenoid valve SV8. The three-way switching valve 183 can switch to at least three settings: the third pump 123 is connected to the aspirator 101, the third pump 123 is connected to the aspirator 101 and the liquid cleaning container 130, and the third pump 123 is disconnected from the aspirator 101 and the liquid cleaning container 130.

The third pump 123 may be a pump such as a syringe pump. The third pump (syringe pump) 123 is operated by a motor 123a. The motor 123a is controlled by the controller 200. The controller 200 drives the motor 123a of the third pump (syringe pump) 123 and causes the third pump (syringe pump) 123 to aspirate or discharge a specimen. The third pump 123 is used to aspirate and discharge a specimen by the aspirator 101.

Figure 24:
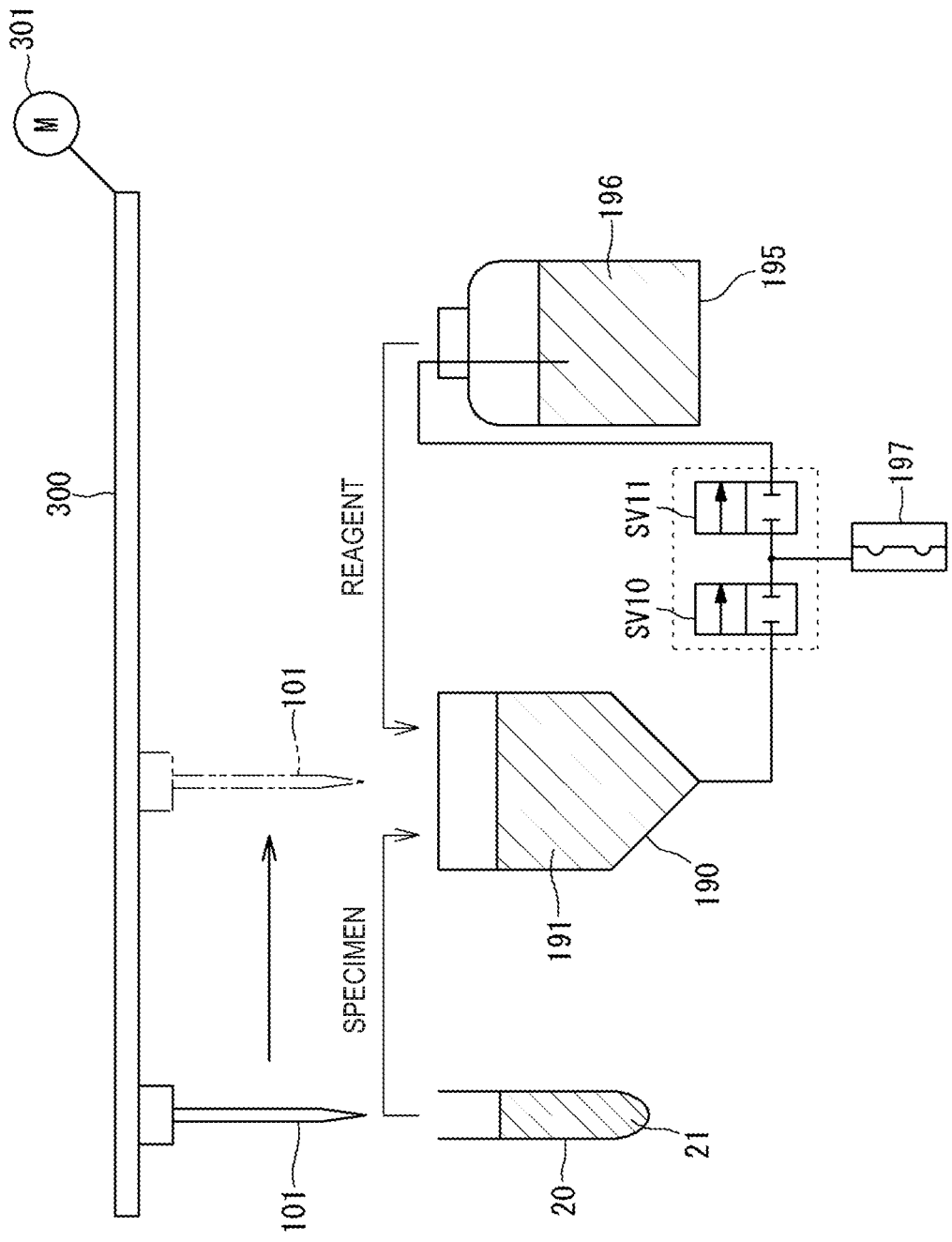
FIG. 24 is an explanatory diagram illustrating movements of an aspirator in a fourth example for specimen aspiration in accordance with one or more embodiments.

As illustrated in FIG. 24, the aspirator 101 can shift from a first position to a second position in a fourth example. At the first position, the aspirator 101 aspirates the specimen 21 from the specimen container 20. At the second position, the aspirator 101 aspirates or discharges a specimen from or to the mixing chamber 190, which may function as a reaction chamber, in the main body 100. The aspirator 101 may be shifted from the first position to the second position with a transfer mechanism 300 in the main body 100. For instance, the transfer mechanism 300 is a mechanism operated by a motor 301 and shifts the aspirator 101. The transfer mechanism 300 can be an endless belt rotated by a motor or a transfer mechanism with a rack and pinion.

The aspirator 101 aspirates the specimen 21 in the specimen container 20 and can dispense the aspirated specimen 21 to the mixing chamber (reaction chamber) 190. A reagent 196 in a reagent container 195 is dispensed to the mixing chamber 190 via a flow path, which connects the reagent container 195 and the mixing chamber 190. In the mixing chamber 190, the specimen 21 and the reagent 196 are mixed, and a mixed specimen 191 is prepared. The aspirator 101 can aspirate the mixed specimen 191 for the detector 102 to measure the specimen.

Figure 25:
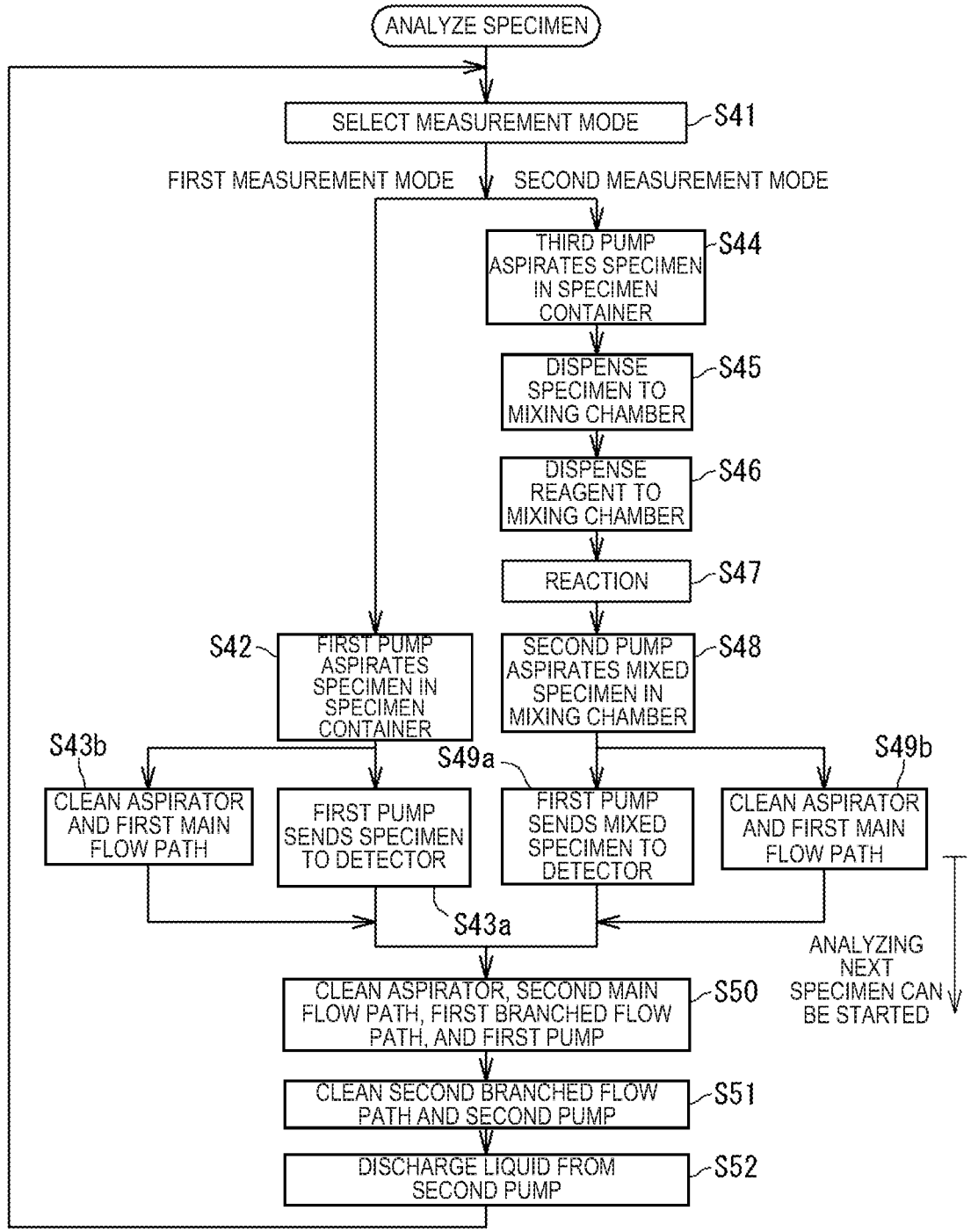
FIG. 25 is a process flow diagram illustrating operational aspects of specimen aspiration for a flow circuit of a fourth example in accordance with one or more embodiments.

The controller 200 controls the flow circuit 100a illustrated in FIG. 23 in a way, such as is shown in FIG. 25. In a step S41, the controller 200 receives a measurement mode selection by a user as well as the step S11. A plurality of measurement modes, which can be set, includes the first measurement mode and the second measurement mode. For example, the first measurement mode is a measurement mode of the CD34-positive stem cell count test or a measurement mode of the hematopoietic tumor cell surface antigen test. The second measurement mode may be a measurement mode of the HIV lymphocyte subset test. The first measurement mode and the second measurement modes use different pumps to aspirate a specimen, such as the first pump 121 and the second pump 122.

When the first measurement mode is selected, the controller 200 drives the first pump 121 to aspirate a specimen and causes the aspirator 101 to aspirate the specimen 21 in the specimen container 20 in a step S42. In a step S43a, the controller 200 drives the first pump 121 to discharge a specimen and causes the specimen in the main flow path 110 to be sent to the detector 102. At the time of operating the step S43a, the controller 200 operates a step S43b and cleans the aspirator 101 and the first main flow path 110a as described above in connection with the step S33b.

Figure 26:
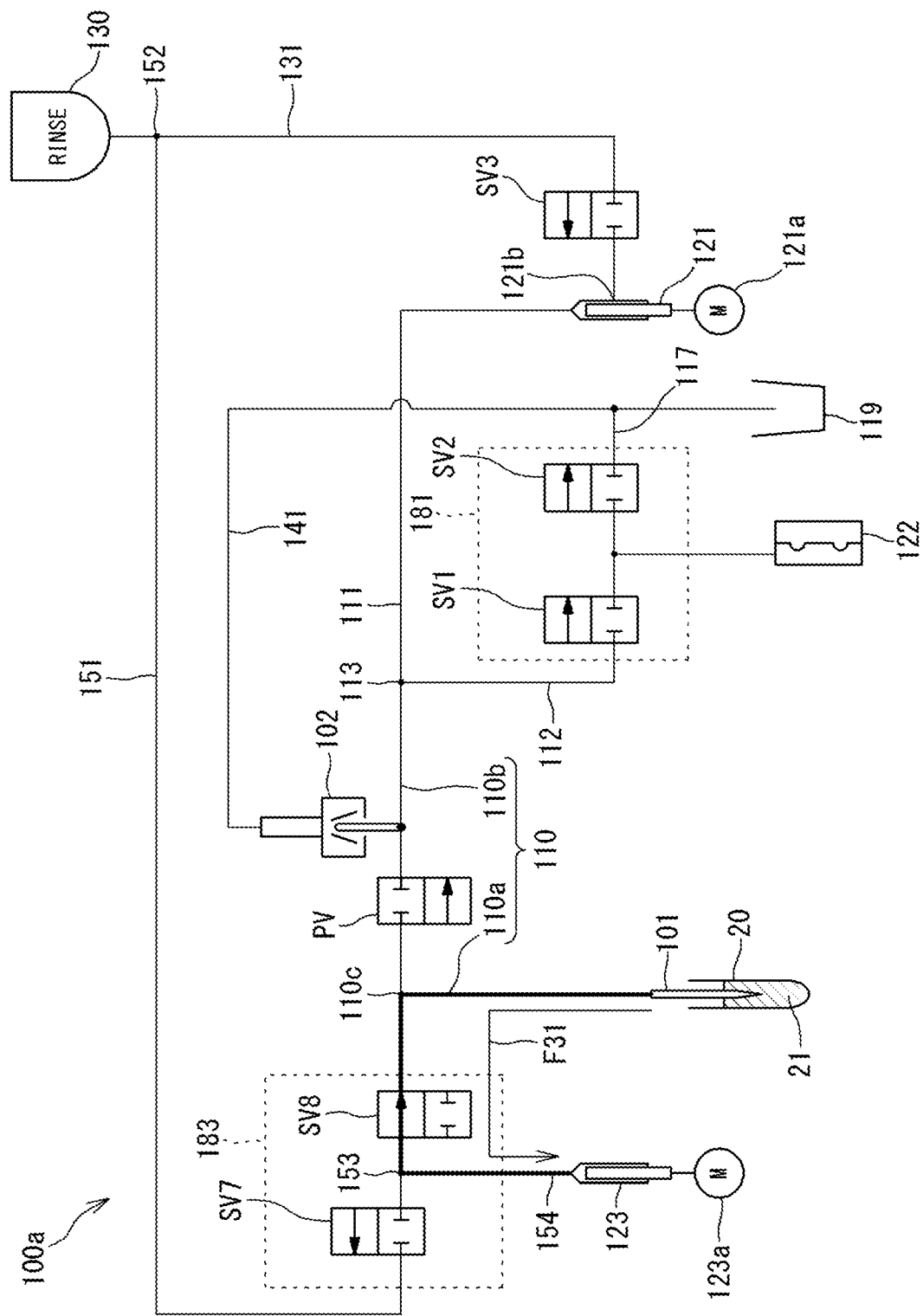
FIG. 26 is a flow circuit diagram further illustrating a fourth example for specimen aspiration in accordance with one or more embodiments.

When the second measurement mode is selected, the controller 200 closes the pinch valve PV, opens the solenoid valve SV8, drives the third pump 123 to aspirate a specimen, and causes an aspiration force F31, such as is shown in FIG. 26, in a step S44. The aspiration force F31 caused by the third pump 123 aspirates the specimen 21 by the aspirator 101. The aspirated specimen 21 flows into the first main flow path 110a, the flow path 151 and the flow path 154. Once a certain quantity of a specimen is aspirated, the controller 200 stops aspiration of a specimen by the third pump 123.

Figure 27:
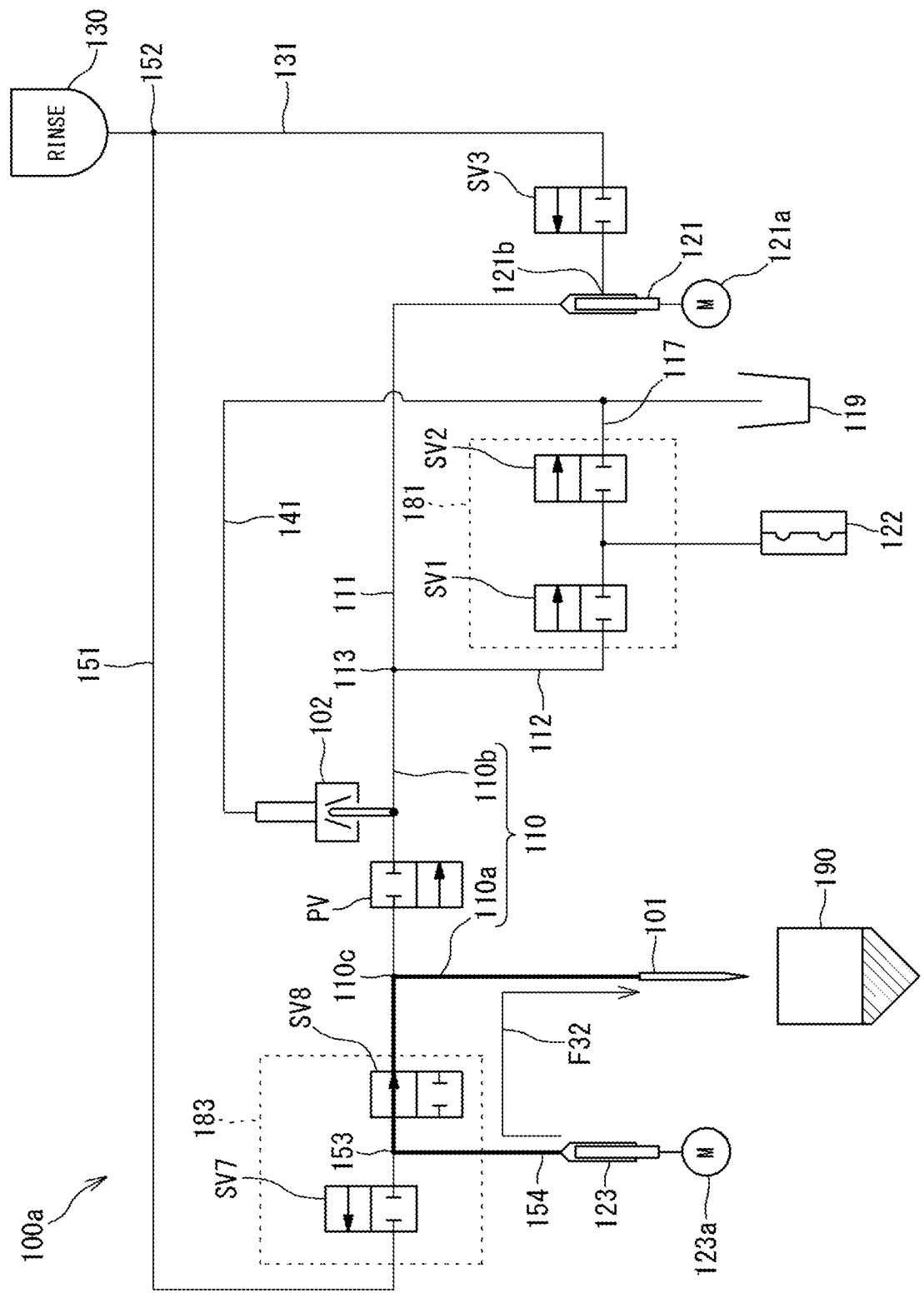
FIG. 27 is a flow circuit diagram further illustrating a fourth example for specimen aspiration in accordance with one or more embodiments.

In a step S45, the controller 200 shifts the aspirator 101 above the mixing chamber 190, drives the third pump 123 to discharge a specimen, and causes a discharging force F32, such as is shown in FIG. 27. The discharging force F32 caused by the third pump 123 dispenses the specimen 21 aspirated by the third pump 123 to the mixing chamber 190.

In a step S46, the controller 200 causes the reagent 196 in the reagent container 195 to be dispensed to the mixing chamber 190. As illustrated in FIG. 24, the reagent 196 in the reagent container 195 is aspirated by the aspiration force caused by a pump 197, and the aspirated reagent 196 is sent to the mixing chamber 190 by the discharging force caused by the pump 197. A solenoid valve SV10 and a solenoid valve SV11 are located between the reagent container 195 and the mixing chamber 190, and these valves can be switched to aspirate and dispense the reagent 196.

Figure 28:
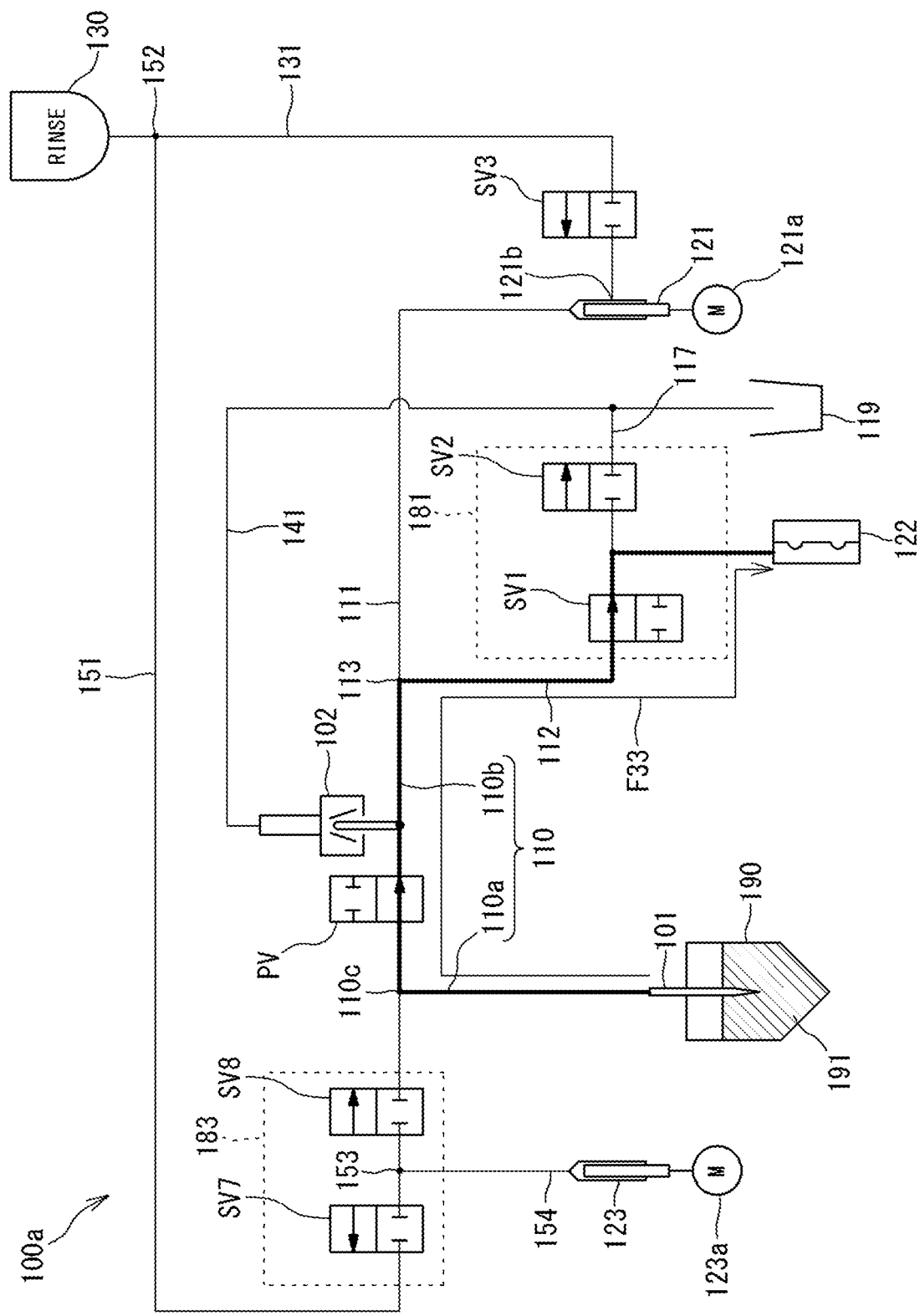
FIG. 28 is a flow circuit diagram further illustrating a fourth example for specimen aspiration in accordance with one or more embodiments.

In a step S47, reaction of the specimen and the reagent contained in a mixed specimen is conducted in the mixing chamber 190. In a step S48, the controller 200 drives the second pump 122 to aspirate the mixed specimen 191 and causes an aspiration force F33 to be generated, such as is shown in FIG. 28. The pinch valve PV and the solenoid valve SV1 are opened in the illustrated condition. Also, the aspirator 101 has already shifted to the position to aspirate the mixed specimen 191 after the reaction in the mixing chamber 190 by the time the pinch valve PV and the solenoid valve SV1 are opened. The aspiration force F33 caused by the second pump 122 aspirates the mixed specimen 191 in the mixing chamber 190 by the aspirator 101. The aspirated mixed specimen 191 flows into the main flow path 110 and the second branched flow path 112. Once a certain quantity of a specimen is aspirated, the controller 200 closes the solenoid valve SV1 and stops the second pump 122 to aspirate the mixed specimen.

In a step S49a, the controller 200 closes the pinch valve PV, drives the first pump 121 to discharge a specimen, and cases a specimen in the main flow path 110 to be sent to the detector 102. The detector 102 measures the specimen and sends a measured value to the controller 200.

The quantity of the mixed specimen 191 in the mixing chamber 190 is relatively large with the added amount of reagent as described above. Therefore, the accuracy of the quantity to aspirate the mixed specimen 191 may be lower than that of the small quantity to aspirate the specimen 21 in the specimen container 20. Thus, the second measurement mode operates the second pump 122, which can aspirate a large quantity of a specimen and achieves efficient specimen aspiration. The first measurement mode can enable the specimen 21 flowing to the main flow path 110 to be directly sent to the detector 102 without sending the specimen 21 to the mixing chamber 190, which reduces the risk of loss of a quantity of a specimen.

Figure 29:
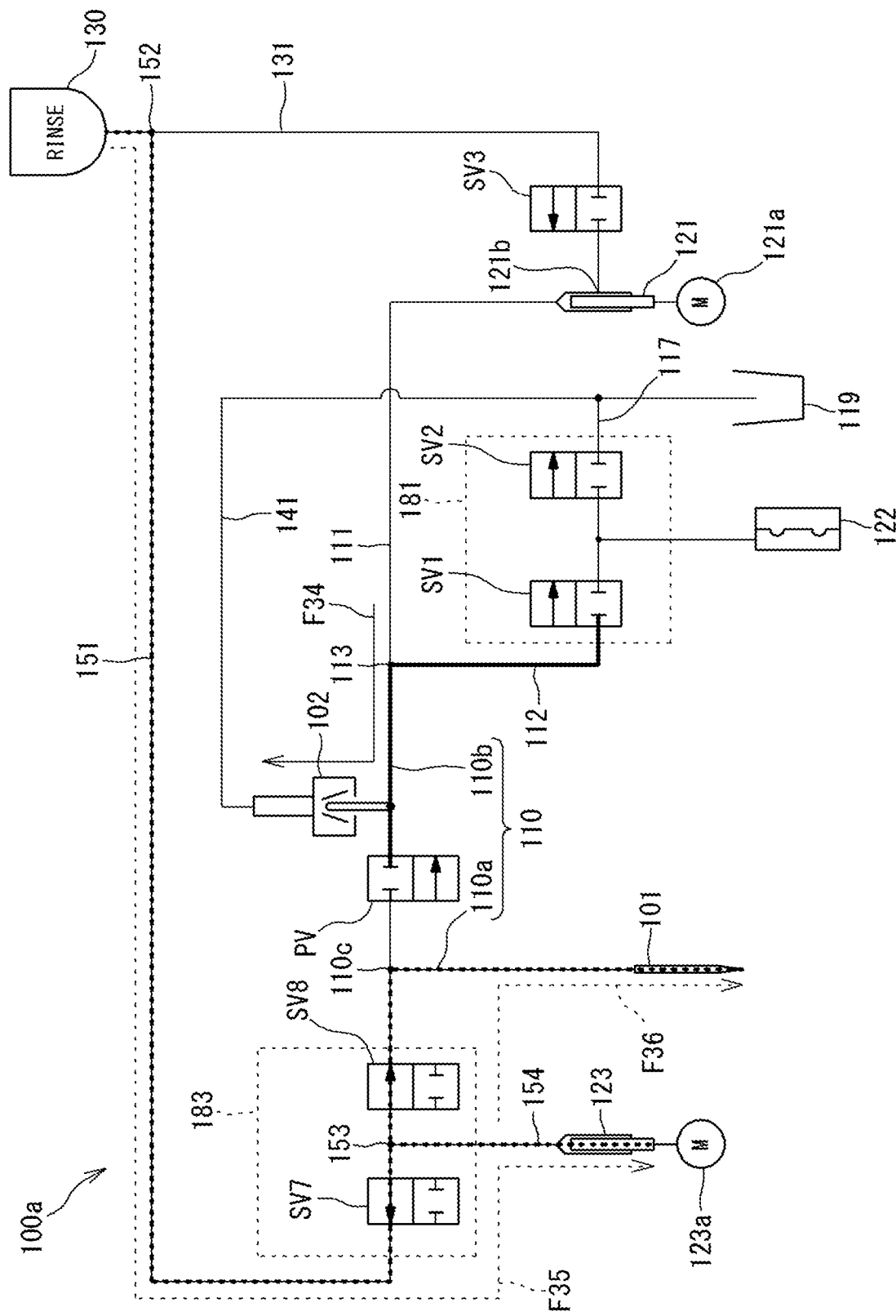
FIG. 29 is a flow circuit diagram further illustrating a fourth example for specimen aspiration in accordance with one or more embodiments.
Figure 30:
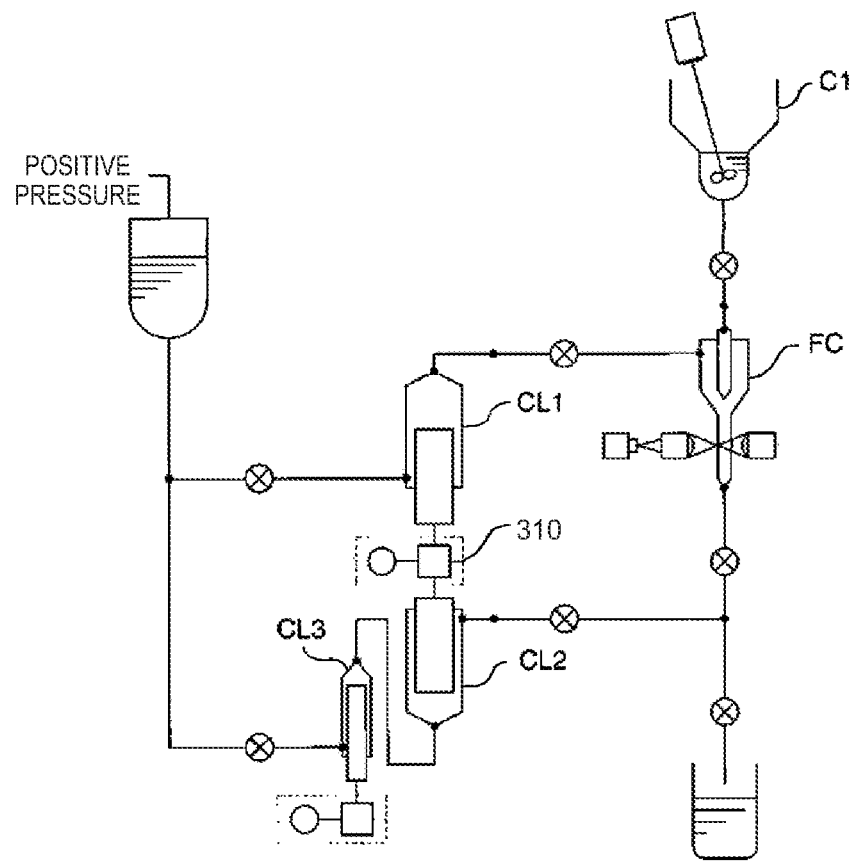
FIG. 30 is a flow circuit diagram illustrating aspects of a flow circuit of the Background Art in accordance with Patent Literature 1.

In a step S43b and a step S49b in a fourth example, the aspirator 101, the first main flow path 110a, the flow path 154, and the third pump 123 may be cleaned while sending a specimen (mixed specimen) to the detector 102 as in other examples of specimen aspiration described herein. In the step S43b and the step S49b, the controller 200 opens the solenoid valve SV7 and the solenoid valve SV8 as illustrated in FIG. 29. The positive pressure on cleaning liquid causes a cleaning liquid flow F35 to flow cleaning liquid from the cleaning liquid container 130 to the flow path 151, the solenoid valve SV7, the flow path 154 and the third pump 123. Also, the positive pressure on cleaning liquid causes a cleaning liquid flow F36, which flows from the solenoid valve SV8 to the first main flow path 110a and the aspirator 101. The cleaning liquid flow F35 and the cleaning liquid flow F36 clean the solenoid valve SV7, the solenoid valve SV8, the flow path 154, the aspirator 101 and the first main flow path 110a. Similar to a third example, the pinch valve PV can also divide the main flow path 110 into a side of the detector 102 and a side of the aspirator 101 in a fourth example. The divided main flow path 110 may be used to conduct measurement of a specimen by the detector 102 and cleaning of the aspirator 101 and the third pump 123 at the same time and can reduce the overall operation time. In other examples, measuring a specimen conducted by the detector 102 and cleaning the aspirator 101 and the third pump 123, however, may be conducted at different times.

From a step S50 to a step S52, the controller 200 cleans the flow circuit 100a. The steps from the step S50 and the step S52 are the same for the first measurement mode and the second measurement mode, and the steps are conducted no matter which measurement mode is selected. The cleaning operations from the step S50 to the step S52 are substantially the same as those from the step S15 to the step S17 illustrated in FIG. 4 and therefore a description will be omitted for brevity. In a fourth example, the aspirator 101 and the first main flow path 110a are already cleaned in the step S43b and the step S49b; therefore, the cleaning time at the step S50 is reduced, and the cleaning efficiency improves.

In a fourth example, in the step S43b and the step S49b the aspirator 101, the first main flow path 110a, the flow path 154 and the third pump 123 are cleaned. Therefore, the step S44 for a next specimen, in which the third pump 123 aspirates the next specimen to be measured from the specimen container 20, can be conducted before measuring a specimen by the detector 102 and cleaning operations from the step S50 to the step S52 are completed.

The operations of the flow circuit 100a in a fourth example, which are not described in this section are substantially the same as operations of the flow circuit 100a in a first example, a second example and a third example.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:
1. A specimen measurement apparatus comprising:
an aspirator via which a specimen is aspirated;
a flow path connected to the aspirator;

a first pump connected to the flow path and configured to generate a first air pressure regulated to aspirate a first amount of the specimen;

a second pump connected to the flow path and configured to generate a second air pressure regulated to aspirate a second amount, which is different from the first amount, of the specimen; and a controller configured to selectively cause either the first pump or the second pump to aspirate the specimen via the aspirator.

2. The specimen measurement apparatus according to claim 1, wherein the second pump comprises a different aspiration ability from the first pump.

3. The specimen measurement apparatus according to claim 1, wherein the controller is able to select a measurement mode from a plurality of measurement modes to measure a specimen; and the controller selects and causes either the first pump or the second pump to aspirate the specimen from the aspirator according to the selected measurement mode.

4. The specimen measurement apparatus according to claim 3, wherein the plurality of measurement modes comprising:

a first measurement mode in which a first quantity of the specimen is aspirated by the first pump; and a second measurement mode in which a second quantity of the specimen different from the first quantity is aspirated by the second pump.

5. The specimen measurement apparatus according to claim 4, wherein the first measurement mode comprises a measurement mode that measures the number of CD34-positive stem cells in the specimen.

6. The specimen measurement apparatus according to claim 4, wherein the first measurement mode comprises a measurement mode that calculates a ratio of predetermined cell-surface-marker-positive cells in the specimen.

7. The specimen measurement apparatus according to claim 4, wherein the second measurement mode comprises a measurement mode that measures the number of CD4-positive lymphocytes in the specimen.

8. The specimen measurement apparatus according to claim 3, wherein the plurality of measurement modes comprising:

a first measurement mode in which a variable quantity of the specimen is aspirated by the first pump; and a second measurement mode in which a fixed quantity of the specimen is aspirated by the second pump.

9. The specimen measurement apparatus according to claim 4, further comprising a mixing chamber, in which the specimen contained in a specimen container and a reagent are dispensed, whereby a mixed specimen is prepared, wherein the plurality of measurement modes comprising:

the first measurement mode in which the specimen in the specimen container is aspirated via the aspirator by the first pump; and the second measurement mode in which the mixed specimen in the mixing chamber is aspirated via the aspirator by the second pump.

10. The specimen measurement apparatus according to claim 1, further comprising a mixing chamber, in which the specimen contained in a specimen container and a reagent are dispensed, whereby a mixed specimen is prepared, wherein the controller causes the first pump to aspirate the specimen in the specimen container via the aspirator; and the controller causes the second pump to aspirate the specimen in the mixing chamber via the aspirator.

11. The specimen measurement apparatus according to claim 1, wherein the first pump comprises a syringe pump, a diaphragm pump, a peristaltic pump, or an air pump; and the second pump comprises a syringe pump, a diaphragm pump, a peristaltic pump, or an air pump.

12. The specimen measurement apparatus according to claim 11, wherein a pump type of the second pump is different from a pump type of the first pump.

13. The specimen measurement apparatus according to claim 1, wherein the first pump comprises a syringe pump; and the second pump comprises a diaphragm pump.

14. The specimen measurement apparatus according to claim 1, wherein the flow path is connected to a detector that measures the specimen aspirated via the aspirator into the flow path.

15. The specimen measurement apparatus according to claim 14, wherein the controller drives at least one of the first pump and the second pump in a condition in which the specimen aspirated via the aspirator into the flow path is sent to the detector.

16. The specimen measurement apparatus according to claim 14, wherein the controller drives a syringe pump in a condition in which the specimen aspirated via the aspirator into the flow path is sent to the detector.

17. The specimen measurement apparatus according to claim 1, wherein the first pump is connected to the flow path via a first branched flow path branched from the flow path; and the second pump is connected to the flow path via a second branched flow path branched from the flow path.

18. The specimen measurement apparatus according to claim 17, wherein the first branched flow path and the second branched flow path are cleaned after the specimen is aspirated via the aspirator into the flow path.

19. The specimen measurement apparatus according to claim 17, further comprising a switching valve that switches and connects the first branched flow path and the second branched flow path to the flow path.

20. A specimen aspiration method comprising:

selecting one of a first measurement mode and a second measurement mode;

driving, based on the selected one of the first measurement mode and the second measurement mode, a first pump for the first measurement mode or a second pump for the second measurement mode; and aspirating a specimen via an aspirator connected to a flow path, based on the driving, by the first pump or by the second pump, wherein a first amount of the specimen is aspirated with the first pump and a second amount, which is different from the first amount, of the specimen is aspirated with the second pump.

* * * * *